(12) United States Patent
Kamada

(10) Patent No.: US 9,190,001 B2
(45) Date of Patent: Nov. 17, 2015

(54) LIQUID CRYSTAL DISPLAY DEVICE, DISPLAY APPARATUS, AND GATE SIGNAL LINE DRIVING METHOD

(75) Inventor: Tsuyoshi Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

(21) Appl. No.: 13/882,844

(22) PCT Filed: Nov. 8, 2011

(86) PCT No.: PCT/JP2011/075748
§ 371 (c)(1),
(2), (4) Date: May 1, 2013

(87) PCT Pub. No.: WO2012/063830
PCT Pub. Date: May 18, 2012

(65) Prior Publication Data
US 2013/0229326 A1 Sep. 5, 2013

(30) Foreign Application Priority Data
Nov. 9, 2010 (JP) .................. 2010-250876

(51) Int. Cl.
*G09G 3/36* (2006.01)
*G02F 1/1362* (2006.01)
(Continued)

(52) U.S. Cl.
CPC .......... *G09G 3/3611* (2013.01); *G02B 27/2264* (2013.01); *G02B 27/26* (2013.01); *G09G 3/3648* (2013.01); *H04N 13/0434* (2013.01); *H04N 13/0454* (2013.01); *H04N 13/0497* (2013.01); *G02F 1/13624* (2013.01);
(Continued)

(58) Field of Classification Search
CPC ....... G09G 3/36; G09G 3/3611; G09G 3/364; G09G 3/3648; G09G 3/2074; G09G 2300/0439; G09G 2300/0443; H04N 13/0285; H04N 13/0289; H04N 13/0452; H04N 13/0454
USPC .................. 345/32, 55, 58, 98, 100, 694, 695
See application file for complete search history.

(56) References Cited

U.S. PATENT DOCUMENTS 5,874,933 A * 2/1999 Hirai et al. ...................... 345/89
2006/0290827 A1* 12/2006 Kihara et al. ................... 349/38
(Continued)

FOREIGN PATENT DOCUMENTS

| JP | 2009-047958 A | 3/2009 |
| JP | 2010-160493 A | 7/2010 |
| WO | WO 2009130826 A1 * | 10/2009 |

OTHER PUBLICATIONS

Official Communication issued in International Patent Application No. PCT/JP2011/075748, mailed on Feb. 14, 2012.
(Continued)

*Primary Examiner* — Dwayne Bost
*Assistant Examiner* — Stefan M Oehrlein
(74) *Attorney, Agent, or Firm* — Keating & Bennett, LLP

(57) ABSTRACT

A control capacitor (CDown) is connected between a pixel electrode of a liquid crystal capacitor (CLC_Bn) in at least one sub-pixel and a common signal line (COM) through a TFT (3) whose gate electrode is connected to a gate signal line (Gn+1), and a control circuit selectively switches output modes in accordance with whether the pulse periods of a gate pulse to be output to the gate signal line (Gn) and a gate pulse to be output to the gate signal line (Gn+1) partially overlap or not.

12 Claims, 24 Drawing Sheets

(51) Int. Cl.
*G02F 1/13363* (2006.01)
*G02F 1/1343* (2006.01)
*H04N 13/04* (2006.01)
*G02B 27/22* (2006.01)
*G02B 27/26* (2006.01)
*G09G 3/00* (2006.01)

(52) U.S. Cl.
CPC .............. *G02F 1/136213* (2013.01); *G02F 2001/133631* (2013.01); *G02F 2001/134345* (2013.01); *G02F 2201/52* (2013.01); *G09G 3/003* (2013.01); *G09G 2300/0426* (2013.01); *G09G 2300/0443* (2013.01); *G09G 2300/0447* (2013.01); *G09G 2310/0205* (2013.01); *G09G 2310/08* (2013.01); *G09G 2320/0209* (2013.01); *H04N 13/0422* (2013.01)

(56) References Cited

U.S. PATENT DOCUMENTS

| | | | |
|---|---|---|---|
| 2007/0268231 A1* | 11/2007 | Kang et al. | 345/100 |
| 2008/0186304 A1* | 8/2008 | You et al. | 345/212 |
| 2009/0009449 A1 | 1/2009 | Uchida et al. | |
| 2011/0025923 A1* | 2/2011 | Tsubata | 348/731 |
| 2011/0128269 A1* | 6/2011 | Lee et al. | 345/211 |

OTHER PUBLICATIONS

Kang et al., "A Novel Polarizer Glasses-type 3D Displays with a Patterned Retarder", 2010 SID International Symposium, Washington State Convention Center, May 25, 2010, SID 10 Digest, pp. 1-3.

* cited by examiner

LIQUID CRYSTAL DISPLAY DEVICE, DISPLAY APPARATUS, AND GATE SIGNAL LINE DRIVING METHOD

TECHNICAL FIELD

The present invention relates to a liquid crystal display device that displays an image using liquid crystals. More specifically, the present invention relates to a liquid crystal display device that stereoscopically displays an image by using a Patterned Retarder, and to a method for driving the liquid crystal display device.

BACKGROUND ART

In recent years, liquid crystal display devices having a function for stereoscopically displaying an image (hereinafter also referred to as "displaying a 3D (stereo) image") in addition to a function for two-dimensionally displaying an image (hereinafter also referred to as "displaying a 2D (flat) image") have been developed.

Technologies for displaying a stereo image, such as an active shutter system, a lenticular system, and a patterned retarder system (or a polarization system, also called a PR system) are known. In any of the systems, presenting a right-eye image only to the right eye of a user and a left-eye image only to the left eye of the user allows the user to visually perceive an image in stereo.

In a liquid crystal display device that employs the active shutter system, left-eye frames (L frames) and right-eye frames (R frames) are alternately displayed. A user observes an image displayed on the liquid crystal display device with 3D glasses, thereby being able to visually perceive the image in stereo. The 3D glasses have a lens for the left eye and a lens for the right eye which provide shutter operations in synchronization with the switching between the L frames and the R frames.

A liquid crystal display device that employs the lenticular system presents a left-eye image and a right-eye image individually to the left eye and the right eye of a user through a lenticular lens formed on the front side of a liquid crystal panel. This allows the user to visually perceive the image in stereo without using 3D glasses.

In a liquid crystal display device that uses a patterned retarder, for example, a right-eye image is displayed using pixels selected through odd-numbered horizontal scanning lines, and a left-eye image is displayed using images selected through even-numbered horizontal scanning lines.

In the following, the patterned retarder system will be more specifically described with reference to FIGS. 34 to 36. FIG. 34 is an exploded perspective view illustrating a backlight unit 50, a liquid crystal panel 60, and a patterned retarder 70, which are included in a liquid crystal display device of the related art that uses a patterned retarder.

The backlight unit 50 emits light to the liquid crystal panel 60 from the back of the liquid crystal panel 60. The liquid crystal panel 60 has formed thereon pixels delimited by horizontal scanning lines (lateral scanning lines) HL1 to HLN (N is the total number of horizontal scanning lines) and vertical signal lines (longitudinal signal lines) VL1 to VLM (M is the total number of vertical signal lines).

In the liquid crystal panel 60, it is possible to control the transmittance of light on a pixel-by-pixel basis by controlling the alignment of liquid crystals in each pixel. In the liquid crystal panel 60, furthermore, a right-eye image is displayed using pixels selected through odd-numbered horizontal scanning lines HL1, HL3, and so forth (hereinafter referred to as odd-numbered pixels), and a left-eye image is displayed using pixels selected through even-numbered horizontal scanning lines HL2, HL4, and so forth (hereinafter referred to as even-numbered pixels).

The patterned retarder 70 is a retarder having a longitudinal direction which is the horizontal scanning line direction, and is composed of two kinds of retarders RR and RL having different characteristics. The retarders RR are configured to convert linearly polarized light into right-handed circularly polarized light, and the retarders RL are configured to convert linearly polarized light into left-handed circularly polarized light.

As illustrated in FIG. 34, the retarders RR, which are shaped into bands whose longitudinal directions are parallel to the horizontal scanning lines, are disposed on the front side of the odd-numbered pixels arranged along the horizontal scanning lines HL1, HL3, and so forth, and, similarly, the retarders RL, which are shaped into bands whose longitudinal directions are parallel to the horizontal scanning lines, are disposed on the front side of the even-numbered pixels arranged along the horizontal scanning lines HL2, HL4, and so forth.

Accordingly, a right-eye image displayed using the odd-numbered pixels is represented by light which is transmitted through the patterned retarder 70 and is then right-handed circularly polarized, and a left-eye image displayed using the even-numbered pixels is represented by light which is transmitted through the patterned retarder 70 and is then left-handed circularly polarized.

FIG. 35 illustrates 3D glasses 80 used in the patterned retarder system. As illustrated in FIG. 35, the 3D glasses 80 include a lens for the right eye and a lens for the left eye. The lens for the right eye transmits only right-handed circularly polarized light, and the lens for the left eye transmits only left-handed circularly polarized light. With the use of the 3D glasses 80, the user is able to observe, in an image displayed on a liquid crystal display device, a right-eye image displayed using the pixels delimited by the odd-numbered horizontal scanning lines (hereinafter referred to as odd-numbered pixel rows), only with the right eye, and a left-eye image displayed using the pixels delimited by the even-numbered horizontal scanning lines (hereinafter referred to as even-numbered pixel rows), only with the left eye. This provides the user with a visual perception of the right-eye image and the left-eye image with parallax as a stereo image.

A liquid crystal display device of the patterned retarder system is also capable of normally displaying a 2D image having no parallax by using both the odd-numbered pixel rows and the even-numbered pixel rows. In this case, the user may simply observe an image displayed on the liquid crystal display device without using 3D glasses.

The 3D glasses 80, which are used in the patterned retarder system, do not require any electrical control, unlike 3D glasses used in the active shutter system, and can therefore be implemented with a simple configuration.

On the other hand, it is known that the patterned retarder system suffers from a phenomenon called crosstalk mainly due to the finite thickness of a glass layer forming a liquid crystal panel.

The crosstalk, as used herein, is a phenomenon in which a right-eye image is mixed into a left-eye image visually perceived by the user or, similarly, a left-eye image is mixed into a right-eye image visually perceived by the user. For example, when the user observes the liquid crystal panel from obliquely above, part of a right-eye image displayed using the odd-numbered pixel rows is observed after passing through the retarders for the left eye, which are disposed on the front side of the even-numbered pixel rows. Thus, the right-eye image is mixed into a left-eye image. Also when the user observes the liquid crystal panel from obliquely below, part of a left-eye image displayed using the even-numbered pixel rows is observed after passing through the retarders for the right eye, which are disposed on the front side of the odd-numbered pixel rows. Thus, the left-eye image is mixed into a right-eye image.

Hitherto, a configuration in which crosstalk, described above, is suppressed by forming black matrices and black stripes on a liquid crystal panel and a patterned retarder, respectively, along the horizontal scanning lines has been known.

FIG. 36 is a schematic partial cross-sectional view of the backlight unit 50, the liquid crystal panel 60, and the patterned retarder 70, which are included in a liquid crystal display device of the related art, taken along the vertical signal line direction (longitudinal direction). In FIG. 36, the configuration around the pixels Pn delimited by the n-th horizontal scanning line and the pixels Pn+1 delimited by the (n+1)-th horizontal scanning line is illustrated. In FIG. 36, the liquid crystal panel 60 and the patterned retarder 70, which are configured such that crosstalk is suppressed by the black matrices BM and the black stripes BS, are illustrated.

As illustrated in FIG. 36, the liquid crystal panel 60 includes a first polarizing plate 60a, a glass substrate 60b, a TFT array 60c, a color filter 60d, a CF glass substrate 60e, a second polarizing plate 60f, and a liquid crystal layer 60g disposed between the TFT array 60c and the color filter 60d.

On the TFT array 60c, circuit-forming elements such as horizontal scanning lines and TFTs are formed between the pixels Pn and the pixels Pn+1. Furthermore, on the front side of the circuit-forming elements, the black matrices BM are formed in the color filter 60d, and the black stripes BS are formed in the patterned retarder 70.

Such black matrices and black stripes as described above can suppress the occurrence of crosstalk when the angle defined between the direction normal to the liquid crystal panel 60 and the direction of the line of sight is within ±α degrees in the vertical signal line direction.

However, this configuration has a problem in that, in addition to a reduction in the luminance of a 2D image and a 3D image due to the use of the patterned retarder 70, a further reduction in luminance due to a reduction in aperture ratio caused by black matrices and black stripes occurs.

In NPL 1 given below, there is proposed a technology for suppressing crosstalk by dividing each pixel into two sub-pixels (an upper sub-pixel and a lower sub-pixel) in the vertical signal line direction, without providing the patterned retarder 70 with black stripes BS. In this technology, when a 2D image is to be displayed, a data voltage used for image display is supplied to both types of sub-pixels, and when a 3D image is to be displayed, a data voltage used for image display is supplied only to the upper sub-pixels and a data voltage used for black display is supplied to the lower sub-pixels. The lower sub-pixels to which the data voltage used for black display is supplied function as black matrices which are large in width.

According to the technology disclosed in NPL 1, therefore, the black stripes BS in the patterned retarder 70 can be omitted, resulting in no reduction in image luminance when a 2D image is displayed. In addition, when a 3D image is to be displayed, the lower sub-pixels function as black matrices and therefore the occurrence of crosstalk can be suppressed.

CITATION LIST

Non Patent Literature

NPL 1: Hoon Kang, Su-Dong Roh, In-Su Baik, Hyun-Joon Jung, Woo-Nam Jeong, Jong-Keun Shin, and In-Jae Chung "A Novel Polarizer Glasses-type 3D Displays with a Patterned Retarder", 2010 SID International Symposium, Seattle Wash. USA, Washington State Convention Center, May 25, 2010, SID 10 DIGEST

SUMMARY OF INVENTION

Technical Problem

In the technology disclosed in NPL 1, however, since different data voltages need to be supplied to the upper sub-pixels and the lower sub-pixels when a 3D image is to be displayed, there is conceived a configuration in which each sub-pixel is provided with a different source bus line. This, however, leads to increased complexity of wiring. The technology disclosed in NPL 1 therefore has a problem in that there is a demand to contrive a configuration in which the complexity of wiring such as data lines (data bus lines and source bus lines) is prevented from increasing.

The present invention has been made in view of the foregoing problem, and an object of the present invention is to provide a liquid crystal display device capable of switching between a 2D display mode and a 3D display mode with suppressed crosstalk without increasing the complexity of wiring such as data bus lines.

Solution to Problem

To overcome the foregoing problem, a liquid crystal display device according to the present invention at least includes
(1) a plurality of gate signal lines,
(2) a plurality of source signal lines,
(3) pixels disposed so as to correspond to intersections between the gate signal lines and the source signal lines,
(4) a gate driver that selectively outputs a gate pulse to the plurality of gate signal lines, and
(5) a control circuit that controls a pulse period of the gate pulse, wherein
(6) each of the pixels includes a plurality of sub-pixels selected through a gate signal line in an n-th line,
(7) a first control capacitor is connected between a pixel electrode of at least one sub-pixel among the plurality of sub-pixels and a common signal line through a first switching element whose gate electrode is connected to one of gate signal lines in (n+1)-th and subsequent lines, and
(8) the control circuit selectively switches between a first output mode in which a pulse period of a gate pulse to be output to the gate signal line in the n-th line and a pulse period of a gate pulse to be output to the one of the gate signal lines in the (n+1)-th and subsequent lines partially overlap and a second output mode in which the pulse periods do not overlap.

In the configuration described above, among the plurality of sub-pixels, the at least one sub-pixel among the plurality of sub-pixels which has a configuration in which the first control capacitor (for example, CDown) is connected between the pixel electrode and the common signal line through the first switching element (for example, TFT 3) is called a specific sub-pixel, whereas, a sub-pixel other than the specific sub-pixel among the plurality of sub-pixels is called a normal sub-pixel.

In the first output mode (for example, a 2D mode), when a gate pulse is output to the gate signal line in the n-th line, a plurality of sub-pixels constituting a single pixel are simultaneously selected. Accordingly, the same signal voltage is written individually to the plurality of sub-pixels through the source signal line corresponding to the pixel.

Note that whether or not liquid crystal capacitors (for example, CLC_An) included in the respective normal sub-pixels hold the same effective voltage after the signal voltage is written depends on the circuit configurations of the normal sub-pixels.

Then, when a gate pulse is output to the gate signal line in the (n+i)-th line among the gate signal lines in the (n+1)-th and subsequent lines, the pulse period of the gate pulse output to the gate signal line in the (n+i)-th line (hereinafter referred to as the (n+i)-th-stage gate pulse) partially overlaps the pulse period of the gate pulse output to the gate signal line in the n-th line (hereinafter referred to as the n-th-stage gate pulse).

The (n+i)-th-stage gate pulse turns on the first switching element whose gate electrode is connected to the gate signal line in the (n+i)-th line. As a result, the signal voltage described above is written to the first control capacitor connected to the pixel electrode of the specific sub-pixel through the first switching element. In this condition, the effective voltage across a liquid crystal capacitor included in the specific sub-pixel does not change and is kept at the same value.

Therefore, in the first output mode, the normal sub-pixels exhibit the luminance corresponding to the signal voltage and the circuit configuration of the normal sub-pixels, and the specific sub-pixel exhibits the luminance corresponding to the signal voltage, which is suitable for the display of a bright two-dimensional image with a normal high aperture ratio.

Meanwhile, in the second output mode (for example, a 3D mode), similarly to the first output mode, first, the plurality of sub-pixels are simultaneously selected by the n-th-stage gate pulse. However, the pulse period of the (n+i)-th-stage gate pulse does not overlap the pulse period of the n-th-stage gate pulse.

Therefore, when the (n+i)-th-stage gate pulse is output to the gate signal line in the (n+i)-th line, the time period during which the n-th-stage gate pulse is output to the gate signal line in the n-th line has expired. As a result, the plurality of sub-pixels are in the state of not being connected to the source signal lines. The reason for this is that the plurality of sub-pixels are sub-pixels selected through the gate signal line in the n-th line.

In this condition, the (n+i)-th-stage gate pulse is output to the gate signal line in the (n+i)-th line. Accordingly, the first switching element is turned on. Thus, the first control capacitor and the liquid crystal capacitor (for example, CLC_Bn) of the specific sub-pixel are brought into connection. Then, the charge accumulated in the liquid crystal capacitor of the specific sub-pixel flows into the first control capacitor. Thus, the charge is redistributed between the liquid crystal capacitor and the first control capacitor. As a result, the effective voltage across the liquid crystal capacitor with respect to the common signal line drops. The degree to which the effective voltage drops becomes larger as the first control capacitor is larger than the liquid crystal capacitor.

In this way, the luminance of the specific sub-pixel can be reduced in the second output mode. If the effective voltage of the specific sub-pixel is lower than a threshold voltage at which a change in an arrangement of liquid crystal molecules starts and, for example, in a normally black mode, it is possible to allow the specific sub-pixel to perform black display.

In the second output mode according to the present invention, therefore, it is possible to create a state where a line in which specific sub-pixels are arranged in the horizontal direction functions as a black stripe. That is, it is possible to apply the liquid crystal display device to a stereo display apparatus of the patterned retarder system described above. The 3D display of this system can provide good 3D display with reduced crosstalk even without using black stripes on a patterned retarder described above.

Furthermore, since there is no need for black stripes on a patterned retarder, a reduction in luminance caused by the patterned retarder can also be avoided for 2D display. Thus, it is possible to implement bright 2D display.

In addition, in the present invention, there is no need to increase the number of source signal lines or increase the number of output lines of a gate driver. This can provide switching between 2D display and 3D display without increasing the complexity of wiring or increasing cost.

To overcome the foregoing problem, a gate signal line driving method according to the present invention includes driving a gate signal line in an n-th line and a gate signal line in an (n+i)-th line so that in a two-dimensional image display mode, a pulse period of an n-th-stage gate pulse to be output to the gate signal line in the n-th line and a pulse period of an (n+i)-th-stage gate pulse to be output to the gate signal line in the (n+i)-th line partially overlap, and so that in a stereo image display mode, the pulse period of the n-th-stage gate pulse and the pulse period of the (n+i)-th-stage gate pulse do not overlap, the gate signal line in the n-th line being disposed so that a plurality of sub-pixels included in one pixel among a plurality of two-dimensionally arranged pixels are simultaneously selected in an n-th horizontal scanning period, the gate signal line in the (n+i)-th line being one of gate signal lines in (n+1)-th and subsequent lines to which a gate electrode of a first switching element is connected, the first switching element and a first control capacitor being connected in series between a pixel electrode of at least one sub-pixel among the plurality of sub-pixels and a common signal line, the gate signal line in the (n+i)-th line being a gate signal line that starts to be selected in an (n+i)-th horizontal scanning period.

In the method described above, the two-dimensional image display mode corresponds to the first output mode described in the liquid crystal display device, and the stereo image display mode corresponds to the second output mode described above.

According to the gate signal line driving method, due to the same principle as the liquid crystal display device, it is possible to provide switching between 2D display and 3D display without increasing the complexity of wiring, compared to the liquid crystal display device of the related art described above.

Advantageous Effects of Invention

As described above, a liquid crystal display device according to the present invention includes a plurality of gate signal lines, a plurality of source signal lines, pixels disposed so as to correspond to intersections between the gate signal lines and the source signal lines, a gate driver that selectively outputs a gate pulse to the plurality of gate signal lines, and a control circuit that controls a pulse period of the gate pulse, wherein each of the pixels includes a plurality of sub-pixels selected through a gate signal line in an n-th line, a first control capacitor is connected between a pixel electrode of at least one sub-pixel among the plurality of sub-pixels and a common signal line through a first switching element whose gate electrode is connected to one of gate signal lines in (n+1)-th and subsequent lines, and the control circuit selectively switches between a first output mode in which a pulse period of a gate pulse to be output to the gate signal line in the n-th line and a pulse period of a gate pulse to be output to the one of the gate signal lines in the (n+1)-th and subsequent lines partially overlap and a second output mode in which the pulse periods do not overlap.

Therefore, in the first output mode, a partial overlap between the pulse period of the n-th-stage gate pulse to be output to the gate signal line in the n-th line and the pulse period of the (n+i)-th-stage gate pulse to be output to one of the gate signal lines in the (n+1)-th and subsequent lines can provide bright 2D display, whereas, in the second output mode, no overlap between the pulse period of the n-th-stage gate pulse and the pulse period of the (n+i)-th-stage gate pulse can provide 3D display with reduced crosstalk.

Consequently, it is possible to provide switching between bright 2D display and 3D display with reduced crosstalk without increasing the complexity of wiring.

DESCRIPTION OF EMBODIMENTS

Embodiment 1

Embodiments of the present invention will be described hereinafter with reference to FIGS. 1 to 6. Note that the dimensions, materials, shapes, relative arrangements, and so forth of the components described in the following embodiments are not intended to limit the scope of this invention only to those unless otherwise specifically indicated, and are merely examples for illustration.

Additionally, in the following description, a liquid crystal display device may be of a Vertical Alignment type (VA liquid crystal display device) that uses a liquid crystal material with negative dielectric anisotropy, or may be a TN (Twisted Nematic) or IPS (In-Plane Switching) liquid crystal display device, and there is no particular limitation.

(Configuration of Pixels in Liquid Crystal Display Device)

Figure 6:
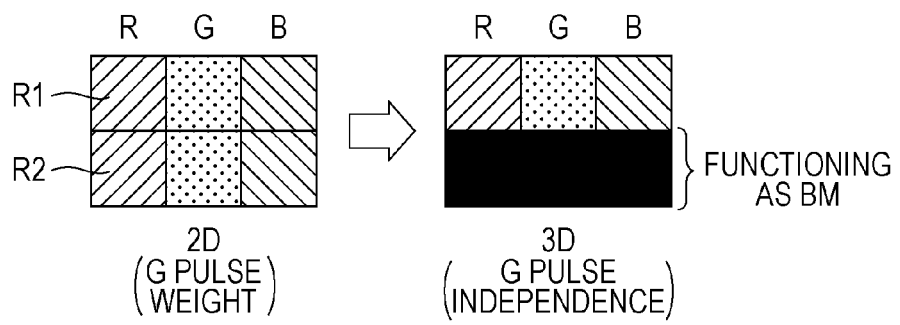
FIG. 6 is an explanatory diagram illustrating an example configuration of pixels in a liquid crystal display device according to Embodiment 1.

FIG. 6 is an explanatory diagram illustrating an example configuration of pixels in a liquid crystal display device according to this embodiment. The liquid crystal display device according to this embodiment is capable of full-color display, and hence each pixel is provided with pixels corresponding to the three primary colors, namely, red (R), green (G), and blue (B). Pixels of four primary colors, namely, one of yellow (Ye), cyan (C), and magenta (M) in addition to the three primary colors, five primary colors, namely, two of them in addition, or six primary colors, namely, all of them in addition, may be used. Alternatively, white (W) may be added to the three primary colors, four primary colors, five primary colors, or six primary colors described above.

As illustrated in FIG. 6, an R pixel is divided into two sub-pixels R1 and R2, and the sub-pixels R1 and R2 are arranged in the direction in which source signal lines described below extend. Similarly to the R pixel, a G pixel and a B pixel are also each divided into two sub-pixels.

A row of sub-pixels including the sub-pixel R1 arranged in the direction in which gate signal lines described below extend is called a first sub-pixel row. Similarly, a row of sub-pixels including the sub-pixel R2 arranged in the direction in which the gate signal lines extend is called a second sub-pixel row.

In the liquid crystal display device according to this embodiment, in a 2D display mode (first output mode) in which a two-dimensional image is displayed, all the sub-pixels of R, G, and B, i.e., a total of six sub-pixels, are driven in accordance with the gradation of the two-dimensional image to be displayed. In a 3D display mode (second output mode) in which a stereo image is displayed, in contrast, the three sub-pixels in the first sub-pixel row are driven in accordance with the gradation of the right-eye image (or left-eye image) to be displayed, and the three sub-pixels in the second sub-pixel row are driven so as to function as black stripes.

(Configuration of Pixel Circuit)

Figure 1:
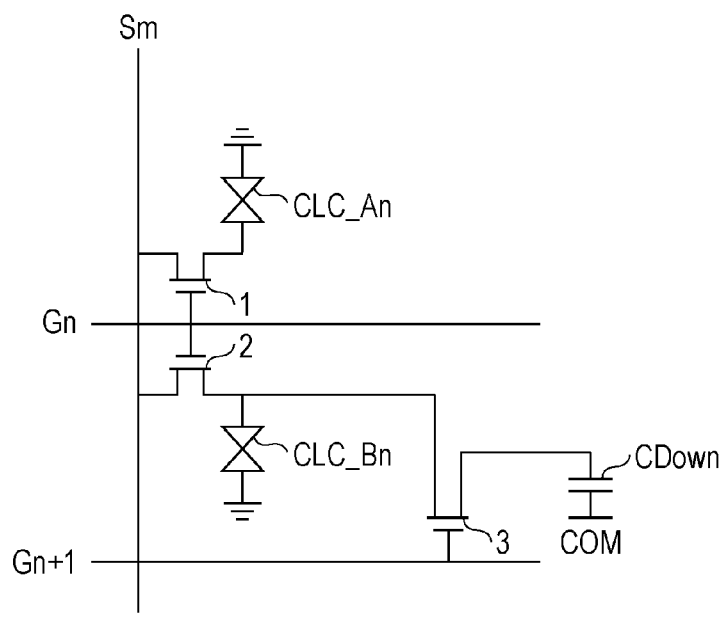
FIG. 1 is a circuit diagram illustrating a basic pixel circuit of a liquid crystal display device according to the present invention, and is a circuit diagram illustrating the equivalent circuit of, for example, pixels of an R pixel among sub-pixels illustrated in FIG. 6.

FIG. 1 is a circuit diagram illustrating a basic pixel circuit of a liquid crystal display device according to the present invention, and is a circuit diagram illustrating the equivalent circuit of, for example, the sub-pixels of the R pixel among the sub-pixels illustrated in FIG. 6. Assuming that a plurality of pixels are two-dimensionally arranged in a matrix of N rows and M columns, as illustrated in FIG. 1, a gate signal line Gn corresponding to the pixels in the n-th row, or the n-th line, and a gate signal line Gn+1 corresponding to the pixels in the (n+1)-th line extend in the horizontal direction. In addition, among a plurality of source signal lines, a source signal line Sm for supplying a signal voltage to the pixels in the m-th column extends to intersect the gate signal lines Gn and Gn+1.

The position of the intersection between the gate signal line Gn to which a gate pulse for selecting the pixels in the n-th line is supplied and the source signal line Sm is represented by (n, m) as in two-dimensional coordinates, and, for example, it is assumed that the R pixel illustrated in FIG. 6 is located at the position (n, m). In this case, the R pixel is provided to correspond to the intersection between the gate signal line Gn and the source signal line Sm.

More specifically, if a liquid crystal capacitor included in the sub-pixel R1 of the R pixel illustrated in FIG. 6 is represented by a liquid crystal capacitor CLC_An and a liquid crystal capacitor included in the sub-pixel R2 is represented by a liquid crystal capacitor CLC_Bn, a pixel electrode of the liquid crystal capacitor CLC_An is connected to the source signal line Sm through a TFT 1 serving as a switching element whose gate electrode is connected to the gate signal line Gn. Similarly, a pixel electrode of the liquid crystal capacitor CLC_Bn is connected to the source signal line Sm through a TFT 2 whose gate electrode is connected to the gate signal line Gn.

Accordingly, the sub-pixels R1 and R2 of the R pixel are selected simultaneously by outputting a gate pulse from a gate driver to the gate signal line Gn.

Furthermore, a control capacitor CDown (first control capacitor) is connected between the pixel electrode of, for example, the sub-pixel R2 among the two sub-pixels R1 and R2 and a common signal line COM whose potential is fixed, through a TFT 3 (first switching element) whose gate electrode is connected to the gate signal line Gn+1. Note that a gate pulse for selecting the pixels in the (n+1)-th line is supplied to the gate signal line Gn+1. The common signal line COM may be the same as a holding capacitor line having the same potential as a common electrode.

In this manner, for each pixel, the gate signal line Gn connected to the TFTs 1 and 2 and the gate signal line Gn+1 connected to the control capacitor CDown are included in a single pixel circuit. Hence, for example, also in the pixels in the (n+1)-th line, the gate signal line Gn+1, which is connected to two TFTs, and a gate signal line Gn+2 connected to the control capacitor CDown are included in a single pixel circuit.

Accordingly, every pixel may be provided with two gate signal lines to which gate pulses of the same timing are supplied. Alternatively, gate signal lines to which gate pulses of the same timing are supplied may be designed with a single line by, for example, wiring a gate electrode extending from the gate signal line in the pixel or extending and wiring a drain electrode connecting a TFT and a pixel electrode.

However, even though every pixel is provided with two gate signal lines, their potentials are always the same, and no need exists to increase the number of output lines of a gate driver. Therefore, the gate driver does not lead to an increase in cost.

(Layout of Pixel Circuit)

Figure 3:
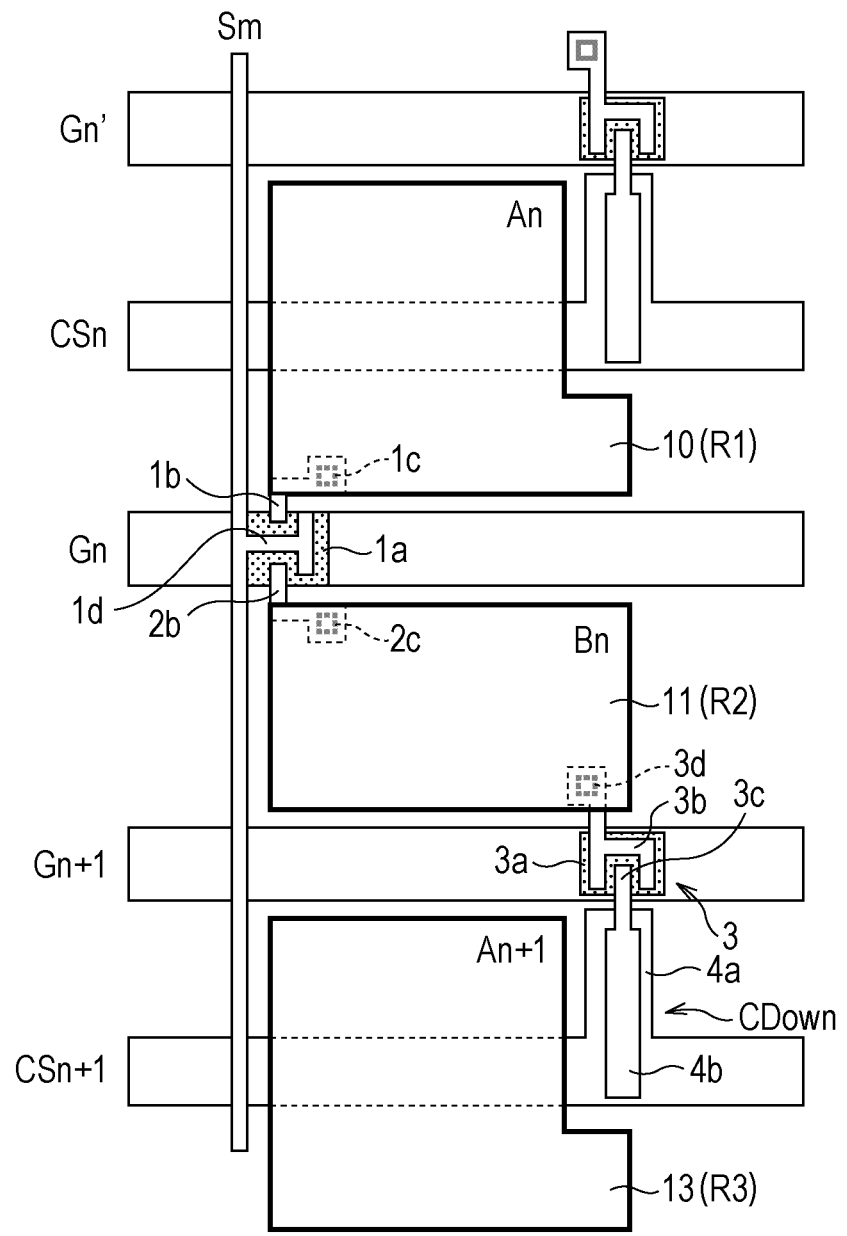
FIG. 3 is a plan view illustrating a schematic layout of the pixel circuit illustrated in FIG. 1 on an active matrix substrate.

FIG. 3 is a plan view illustrating a schematic layout of the pixel circuit illustrated in FIG. 1 on an active matrix substrate.

As illustrated in FIG. 3, a gate signal line Gn', the gate signal line Gn, and the gate signal line Gn+1 are wired at certain intervals in this order in the direction in which the source signal line Sm extends. The direction from the gate signal line Gn' to the gate signal line Gn+1 is equal to the direction from the (n−1)-th line to the (n+1)-th line. The source signal line Sm intersecting the gate signal lines Gn', Gn, and Gn+1 is wired over the gate signal lines Gn', Gn, and Gn+1.

As described above, gate pulses for selecting the pixels in the n-th line are supplied simultaneously to the gate signal lines Gn' and Gn. In this manner, a gate signal line to be paired with the gate signal line Gn is represented by a gate signal line Gn'.

A pixel electrode 10 of the liquid crystal capacitor CLC_An is disposed between the gate signal line Gn' and the gate signal line Gn. Further, a pixel electrode 11 of the liquid crystal capacitor CLC_Bn is disposed between the gate signal line Gn and the gate signal line Gn+1. Further, a pixel electrode 13 of a liquid crystal capacitor CLC_An+1 is disposed between the gate signal line Gn+1 and a gate signal line Gn+1' (not illustrated).

The TFT 1 is disposed at the intersection between the gate signal line Gn and the source signal line Sm, and an electrode 1b extending from a semiconductor layer 1a located on the gate signal line Gn toward the pixel electrode 10 is connected to the pixel electrode 10 through a through-hole 1c.

Further, the TFT 2, which shares the semiconductor layer 1a and an electrode 1d connected to the source signal line Sm with the TFT 1, is located at the intersection between the gate signal line Gn and the source signal line Sm. An electrode 2b of the TFT 2 extends from the semiconductor layer 1a toward the pixel electrode 11, and is connected to the pixel electrode 11 through a through-hole 2c.

Meanwhile, the TFT 3 is located on the gate signal line Gn+1 to correspond to a position diagonal to the through-hole 2c in the pixel electrode 11. Among an electrode 3b and an electrode 3c which face on a semiconductor layer 3a on the gate signal line Gn+1, the electrode 3b extends from the semiconductor layer 3a toward the pixel electrode 11, and is connected to the pixel electrode 11 through a through-hole 3d.

Further, a holding capacitor line CSn+1 whose potential is the same as the common electrode is wired in parallel to the gate signal line Gn+1 in a layer below the pixel electrode 13 and the source signal line Sm. The electrode 3c extends onto an electrode 4a extending from the holding capacitor line CSn+1 toward the gate signal line Gn+1, and a portion 4b facing the electrode 4a has a large area. The electrode 4a and the portion 4b form the control capacitor CDown.

The configuration of a pixel having the layout described above is repeated for all the pixels.

(Gate Pulse)

Figure 2:
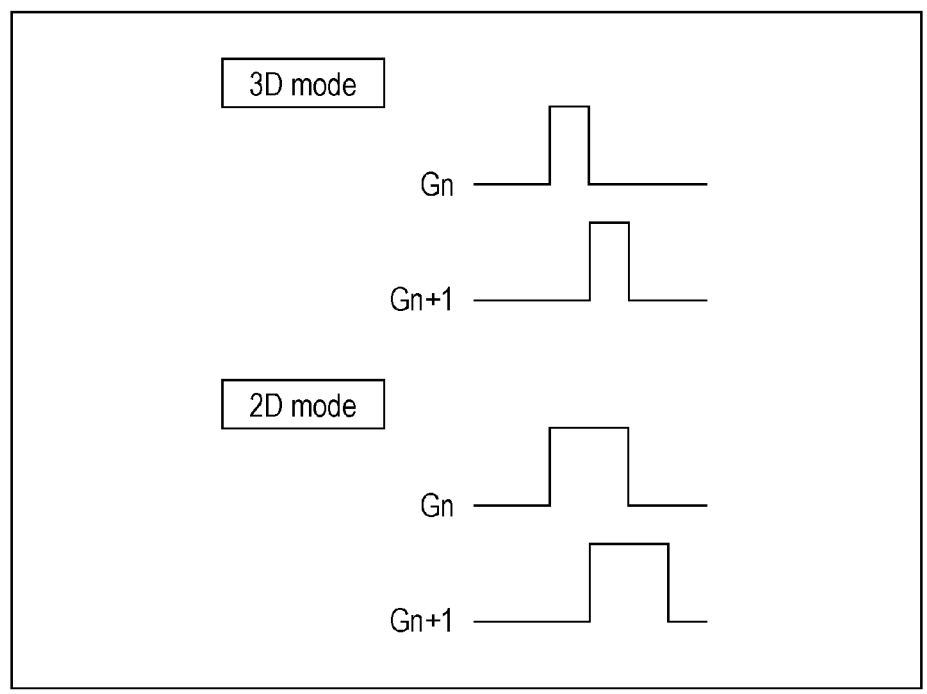
FIG. 2 is a waveform diagram illustrating, for each of a 3D display mode and a 2D display mode, the waveforms of an n-th-stage gate pulse to be output to the gate signal line in the n-th line and an (n+1)-th-stage gate pulse to be output to the gate signal line in the (n+1)-th line.

FIG. 2 is a waveform diagram illustrating, for each of the 3D display mode and the 2D display mode, the waveforms of an n-th-stage gate pulse to be output to the gate signal line in the n-th line and an (n+1)-th-stage gate pulse to be output to the gate signal line in the (n+1)-th line.

As illustrated in FIG. 2, first, in the 3D display mode, the n-th-stage gate pulse to be output to the gate signal line Gn and the (n+1)-th-stage gate pulse to be output to the gate signal line Gn+1 are set so that their pulse periods do not overlap. For example, the pulse period of each of the n-th-stage gate pulse and the (n+1)-th-stage gate pulse is equal to one horizontal scanning period, or 1H, and the (n+1)-th-stage gate pulse rises synchronously with the falling edge of the n-th-stage gate pulse.

In the 2D display mode, in contrast, the pulse period of the (n+1)-th-stage gate pulse partially overlaps the pulse period of the n-th-stage gate pulse. For example, the pulse period of each of the n-th-stage gate pulse and the (n+1)-th-stage gate pulse is equal to two times the horizontal scanning period H, or 2H, and the overlapping period of the n-th-stage gate pulse and the (n+1)-th-stage gate pulse lasts for 1H.

In this manner, it is preferable that the n-th-stage gate pulse and the (n+1)-th-stage gate pulse have the same output timing in the 2D display mode and the 3D display mode. In this case, it is possible to switch display modes only by changing the pulse width, such as increasing the pulse widths of the n-th-stage gate pulse and the (n+1)-th-stage gate pulse in the 2D display mode and reducing the pulse widths of the n-th-stage gate pulse and the (n+1)-th-stage gate pulse in the 3D display mode.

In theory, the pulse period of a one-stage gate pulse is not limited to 2H, described above, and may be 3H, 4H, or larger. Furthermore, the overlapping period is not limited to 1H, and may be designed to be 0.5H or 0.25H since it depends on the value of capacitance of the control capacitor CDown and the amount of current allowed by the TFT 3 to flow.

The pulse periods of the n-th-stage gate pulse and the (n+1)-th-stage gate pulse in the 2D display mode and the 3D display mode described above are common to all the embodiments.

(Driving Example in 2D Display Mode)

Figure 4:
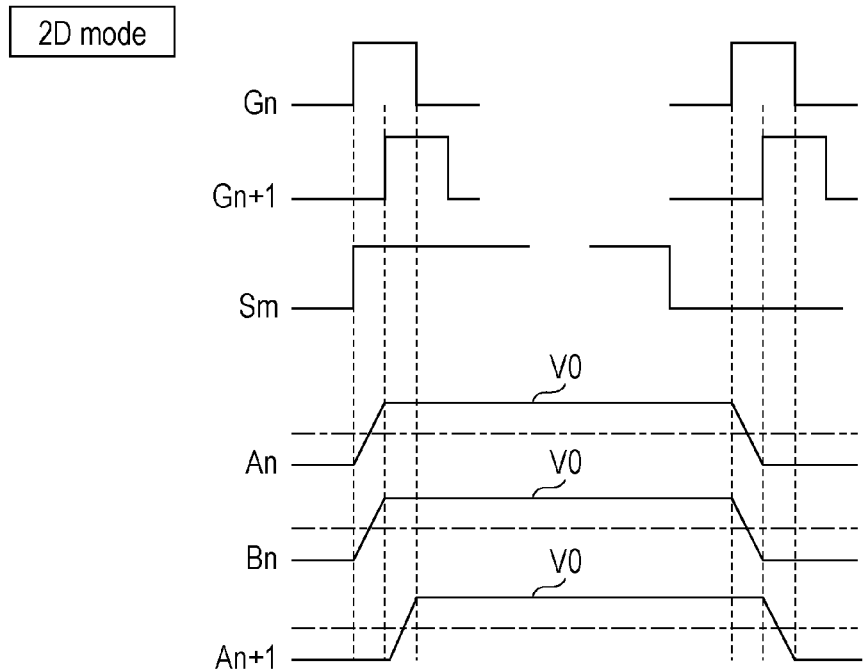
FIG. 4 is a timing chart illustrating the waveforms of gate pulses, signal voltages, and voltages applied to the respective liquid crystal capacitors in the 2D display mode.

FIG. 4 is a timing chart illustrating the waveforms of gate pulses, signal voltages, and voltages applied to the respective liquid crystal capacitors in the 2D display mode.

The sub-pixel R2 having a configuration in which the control capacitor CDown is connected between the pixel electrode and the common signal line COM through the TFT 3 is hereinafter called a specific sub-pixel R2, whereas the sub-pixel other than the specific sub-pixel R2, that is, the sub-pixel R1, is hereinafter called a normal sub-pixel R1.

In the following description of operation, the effect of the pull-in phenomenon (also called a field through phenomenon) caused by parasitic capacitance of a TFT immediately after the state of the TFT is switched from an on state to an off state, on the effective voltage across a liquid crystal capacitor is not considered because it does not relate to the essence of the present invention.

As illustrated in FIG. 4, in the 2D display mode, when an n-th-stage gate pulse is output to the gate signal line Gn, the normal sub-pixel R1 and the specific sub-pixel R2 are simultaneously selected. Accordingly, the same signal voltage is written to the liquid crystal capacitors CLC_An and CLC_Bn of the normal sub-pixel R1 and the specific sub-pixel R2 through the source signal line Sm.

Then, when an (n+1)-th-stage gate pulse is output to the gate signal line Gn+1, since the pulse period of the (n+1)-th-stage gate pulse partially overlaps the pulse period of the n-th-stage gate pulse, the TFT 3 is turned on in a time period during which the normal sub-pixel R1 and the specific sub-pixel R2 are selected. As a result, the signal voltage described above is written to the control capacitor CDown connected to the pixel electrode of the specific sub-pixel R2 through the TFT 3. In this condition, the effective voltage across the liquid crystal capacitor CLC_Bn of the specific sub-pixel R2 does not change and is kept at the same value (V0).

In the 2D display mode, therefore, as illustrated in FIG. 6, the normal sub-pixel R1 and the specific sub-pixel R2 exhibit the same luminance corresponding to the signal voltage described above. In this case, there is no problem in applying the configuration according to this embodiment to a VA mode or TN mode liquid crystal display device, although the multipixel-based effect of improvements in viewing angle is not ascertainable. In contrast, the configuration according to this embodiment is more preferably applicable to an IPS mode or Blue Phase mode liquid crystal display device, which does not require a multi-pixel structure, or to a mobile liquid crystal display device which does not indicate serious problems in viewing angle characteristics.

(Driving Example in 3D Display Mode)

Figure 5:
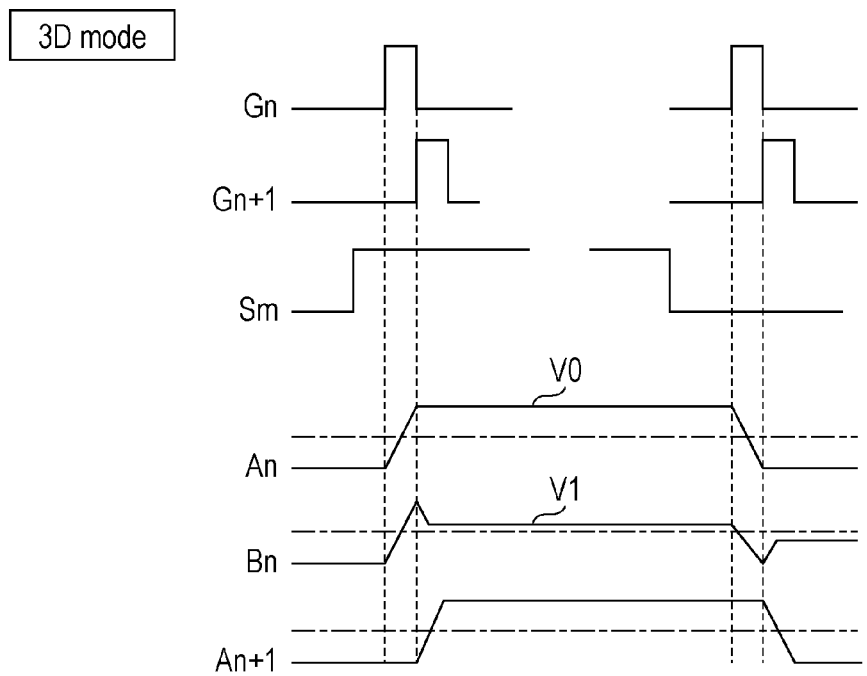
FIG. 5 is a timing chart illustrating the waveforms of gate pulses, signal voltages, and voltages applied to the respective liquid crystal capacitors in the 3D display mode.

Meanwhile, as illustrated in FIG. 5, in the 3D display mode, similarly to the 2D display mode, first, the normal sub-pixel R1 and the specific sub-pixel R2 are simultaneously selected by the n-th-stage gate pulse. However, the pulse period of the (n+1)-th-stage gate pulse does not overlap the pulse period of the n-th-stage gate pulse.

Thus, the time period during which the n-th-stage gate pulse is output to the gate signal line Gn has expired when the (n+1)-th-stage gate pulse is output to the gate signal line Gn+1. As a result, when the (n+1)-th-stage gate pulse is output to the gate signal line Gn+1, the normal sub-pixel R1 and the specific sub-pixel R2 are in the state of not being connected to the source signal line Sm.

In this condition, the (n+1)-th-stage gate pulse is output to the gate signal line Gn+1. Then, the TFT 3 is turned on, bringing the control capacitor CDown and the liquid crystal capacitor CLC_Bn into connection with each other. Thus, as illustrated in FIG. 5, the effective voltage across the liquid crystal capacitor CLC_An with respect to the common signal line COM does not change and is kept at the effective voltage V0, whereas, the effective voltage across the liquid crystal capacitor CLC_Bn with respect to the common signal line COM drops from the effective voltage V0 to the effective voltage V1. The reason for this is that the charge accumulated in the liquid crystal capacitor CLC_Bn flows into the control capacitor CDown, causing the charge to be redistributed between the liquid crystal capacitor CLC_Bn and the control capacitor CDown.

The effective voltage V1 and the effective voltage V0 have a relationship represented by the formula given below if the charge accumulated in CDown before the redistribution of the charge is 0.

$$V1 = V0 \times CLC\_Bn/(CLC\_Bn + CDown)$$

That is, the larger the value of CDown, the smaller the effective voltage V1.

In this way, as illustrated in FIG. 6, in the 3D display mode, it is possible to reduce the luminance of the specific sub-pixel R2 while writing the same signal voltage to the normal sub-pixel R1 and the specific sub-pixel R2. Further, in a case where the following conditions (1) and (2) are satisfied, it is possible to allow the specific sub-pixel R2 to perform black display.

Condition (1): Set the value of CDown so that the effective voltage of the specific sub-pixel R2 is lower than a threshold voltage at which a change in the alignment of liquid crystal molecules starts, even if a maximum signal voltage is applied.

Condition (2): The operation mode of the liquid crystal display device is a normally black mode.

If the value of CDown is one to two times the value of CLC_Bn, making the specific sub-pixel R2 dark can substantially be achieved.

In the 3D display mode, therefore, it is possible to create the state that allows the second sub-pixel row in which the specific sub-pixel R2 is arranged in the horizontal direction to function as a black stripe. That is, it is possible to apply the liquid crystal display device described above to a stereo display apparatus of the patterned retarder system described above. Since 3D display in this system does not require the black stripes of the patterned retarder described above, bright 3D display can be provided.

Moreover, since the black stripes of the patterned retarder are not required, a reduction in brightness caused by the patterned retarder is also avoidable for 2D display. Thus, bright 2D display can be performed.

In addition, in the present invention, since there is no need to increase the number of source signal lines, it is possible to perform switching between 2D display and 3D display without any increase in the complexity of wiring.

In terms of the effect of reduced crosstalk in 3D display, it is possible to achieve this effect if it is only required to reduce the luminance of the second sub-pixel row. For example, the value of CDown is set to be greater than or equal to that of CLC_Bn, thereby achieving a more preferable effect.

The effect achieved by the setting of the values of CDown and CLC_Bn, as described here, applies to all the other embodiments described below.

(Polarity Inversion of Source Signal)

Meanwhile, the source signal to be supplied to the source signal line Sm may be a source signal whose polarity is inverted frame by frame. In this case, the drop of the effective voltage across the liquid crystal capacitor CLC_Bn can be made larger than that in the case where the polarity of the source signal is not inverted frame by frame. The reason for this will be described hereinafter.

For example, it is assumed that an (n+1)-th-stage gate pulse is output to the gate signal line Gn+1, and the plus charge accumulated in the liquid crystal capacitor CLC_Bn is redistributed between the liquid crystal capacitor CLC_Bn and the control capacitor CDown.

In this case, in the control capacitor CDown, minus charge has already been redistributed between the liquid crystal capacitor CLC_Bn and the control capacitor CDown in the frame preceding the current frame. Hence, in the current frame, the plus charge accumulated in the liquid crystal capacitor CLC_Bn cancels the minus charge already accumulated in the control capacitor CDown, and is further redistributed. As a result, the drop of the effective voltage across the liquid crystal capacitor CLC_Bn can be made larger, resulting in the luminance of the specific sub-pixel R2 being more reduced.

The effect of polarity inversion of a source signal describe above applies to all the other embodiments described below.

(Example Configuration of Liquid Crystal Display Device)

Figure 27:
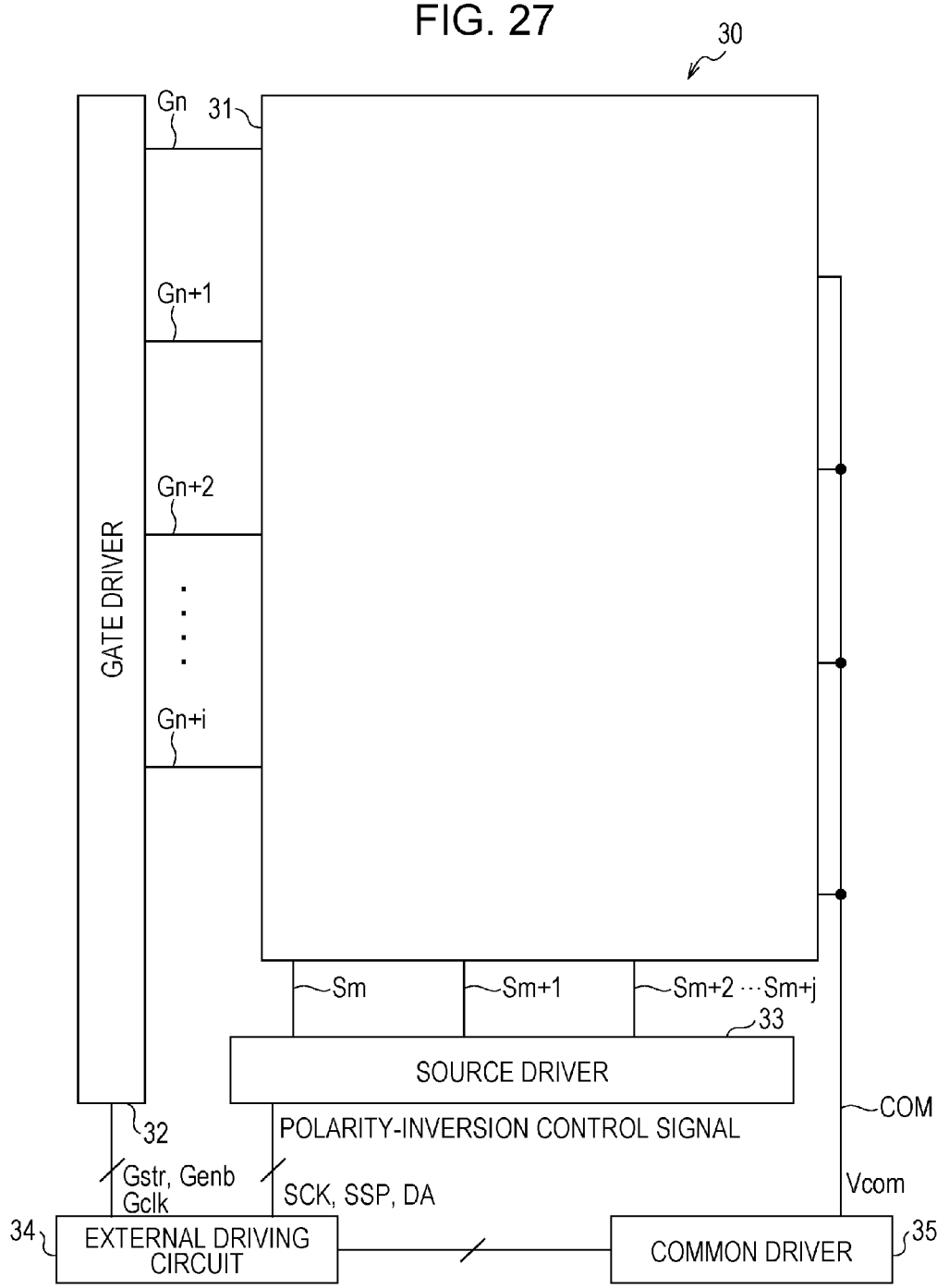
FIG. 27 is a block diagram illustrating an example configuration of a liquid crystal display device according to the present invention.

FIG. 27 is a block diagram illustrating an example configuration of a liquid crystal display device according to the present invention. As illustrated in FIG. 27, a liquid crystal display device 30 is an active-matrix display device, and includes a display unit 31, a gate driver 32, a source driver 33, an external driving circuit 34 (control circuit), and a common driver 35.

On the display unit 31, pixel circuits each illustrated in FIG. 1 and the like are arranged in a matrix of N rows and M columns.

As described with reference to FIG. 2 and the like, in the 3D display mode, the gate driver 32 outputs an n-th-stage gate pulse and an (n+1)-th-stage gate pulse or an (n+i)-th-stage (i is an integer greater than or equal to 2) gate pulse described below, whose pulse periods do not overlap, whereas, in the 2D display mode, the gate driver 32 outputs an n-th-stage gate pulse and an (n+1)-th-stage gate pulse ((n+i)-th-stage), whose pulse periods partially overlap. The detailed configuration of the gate driver 31 that outputs the gate pulses described above will be described in detail below.

The source driver 33 supplies a signal potential whose polarity is inverted, for example, every frame to the source bus line Sm on the basis of a digital image signal DA. The source driver 33 is capable of also supplying signal potentials of opposite polarities to two adjacent source bus lines Sm and Sm+1 during the same frame period, if necessary.

The external driving circuit 34 generates various control signals, and controls the output of the gate driver 32, the source driver 33, and the common driver 35.

More specifically, the external driving circuit 34 receives, from an external signal source, a digital video signal Dv indicating an image to be displayed, a horizontal synchronization signal HSY and a vertical synchronization signal VSY corresponding to the digital video signal Dv, and a control signal Dc for controlling a display operation.

Further, the external driving circuit 34 supplies the digital image signal DA indicating an image to be displayed and the various signals described above to the source driver 33 on the basis of the received signals Dv, HSY, VSY, and Dc. The various signals described above are signals for displaying the image indicated by the digital video signal Dv on the display unit 31, and include, for example, a data start pulse signal SSP, a data clock signal SCK, a polarity inversion signal, and so forth.

Further, the external driving circuit 34 generates a gate clock signal Gclk, a gate start pulse signal Gstr, a gate enable signal Genb, and so forth described below, and supplies them to the gate driver 32. Particularly, the external driving circuit 34 modifies, by way of example, the gate enable signal Genb or modifies, by way of another example, the gate start pulse signal Gstr to selectively switch between the 2D display mode (first output mode) and the 3D display mode (second output mode), and serves as a control circuit that controls the pulse period of a gate pulse in accordance with each display mode.

The common driver 35 generates the previously described common potential Vcom in accordance with the control of the external driving circuit 34, and outputs the common potential Vcom to the common signal line COM.

(Example Configuration of Gate Driver)

Figure 28:
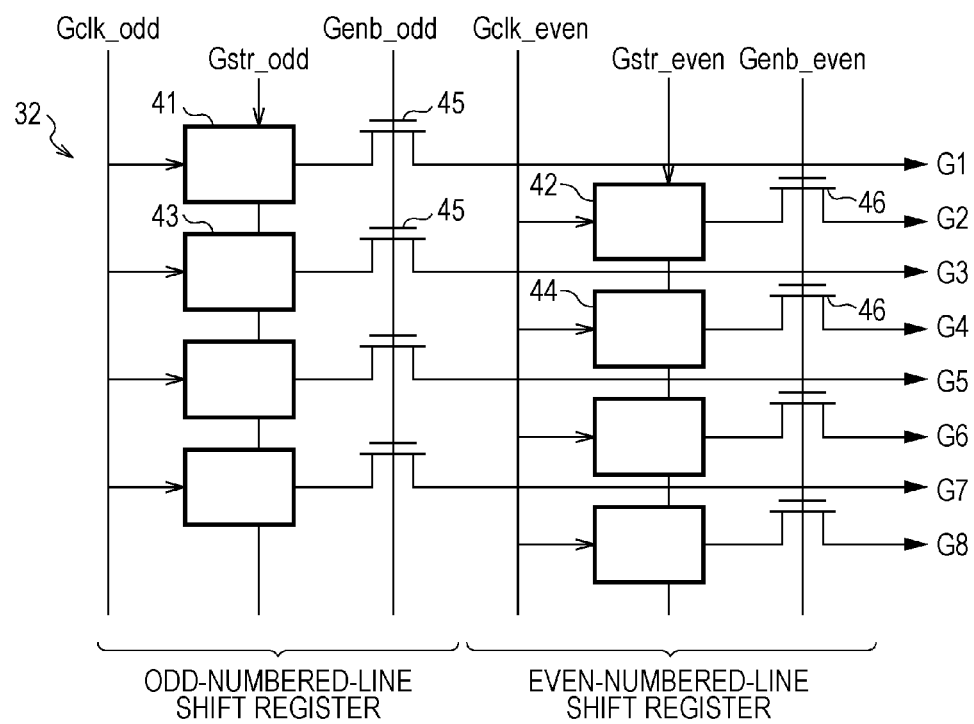
FIG. 28 is a block diagram illustrating an example configuration of a gate driver.

Next, an example configuration of a gate driver applicable to all the embodiments of the present invention will be described. FIG. 28 is a block diagram illustrating an example configuration of the gate driver 32.

The gate driver 32 includes a shift register dedicated to the odd-numbered lines and a shift register dedicated to the even-numbered lines. The shift register dedicated to the odd-numbered lines outputs a gate pulse to the gate signal lines (G1, G3, etc.) in the odd-numbered lines, and the shift register dedicated to the even-numbered lines outputs a gate pulse to the gate signal lines (G2, G4, etc.) in the even-numbered lines.

The shift register dedicated to the odd-numbered lines includes unit circuits (41, 43, etc.) corresponding to the respective odd-numbered lines, and the shift register dedicated to the even-numbered lines includes unit circuits (42, 44, etc.) corresponding to the respective even-numbered lines. Since the shift register dedicated to the odd-numbered lines and the shift register dedicated to the even-numbered lines have the same configuration, a description will be given hereinafter of the shift register dedicated to the odd-numbered lines.

For example, the unit circuit 41 corresponding to the gate signal line G1 generates a gate pulse in response to an input thereto of an odd-numbered clock signal Gclk_odd (see FIG. 28) serving as the gate clock signal Gclk and an odd-numbered start pulse signal Gstr_odd (see FIG. 28) serving as the gate start pulse signal Gstr.

The gate pulse output from the unit circuit 41 is output through a switching element 45 whose gate opening and closing is controlled by an odd-numbered enable signal Genb_odd serving as the gate enable signal Genb.

The configuration of all the unit circuits forming the shift register dedicated to the odd-numbered lines is basically the same as the configuration of the unit circuit 41. In the unit circuit 41 at the initial stage, however, the generation of a gate pulse is set by the H period of the odd-numbered start pulse signal Gstr_odd, and is reset at the timing when the unit circuit 43 in the subsequent stage outputs a gate pulse. In contrast, in each of the unit circuit 43 in the subsequent stage and the following unit circuits, the generation of a gate pulse is set by the H period of the output of the unit circuit in the preceding stage, and is reset at the timing when the unit circuit in the subsequent stage outputs a gate pulse.

(Operation of Gate Driver to 2D Display Mode)

Figure 29:
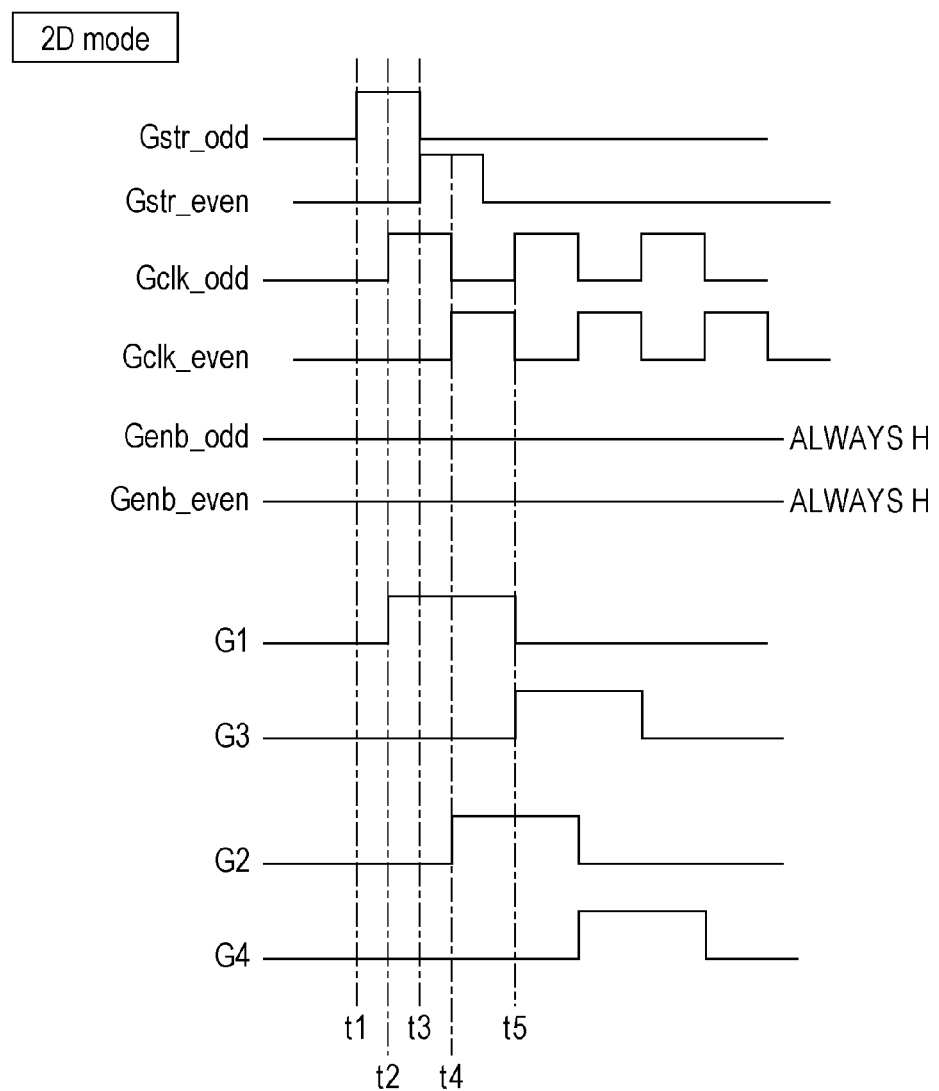
FIG. 29 is a timing chart illustrating the operation of the gate driver in the 2D display mode.
Figure 30:
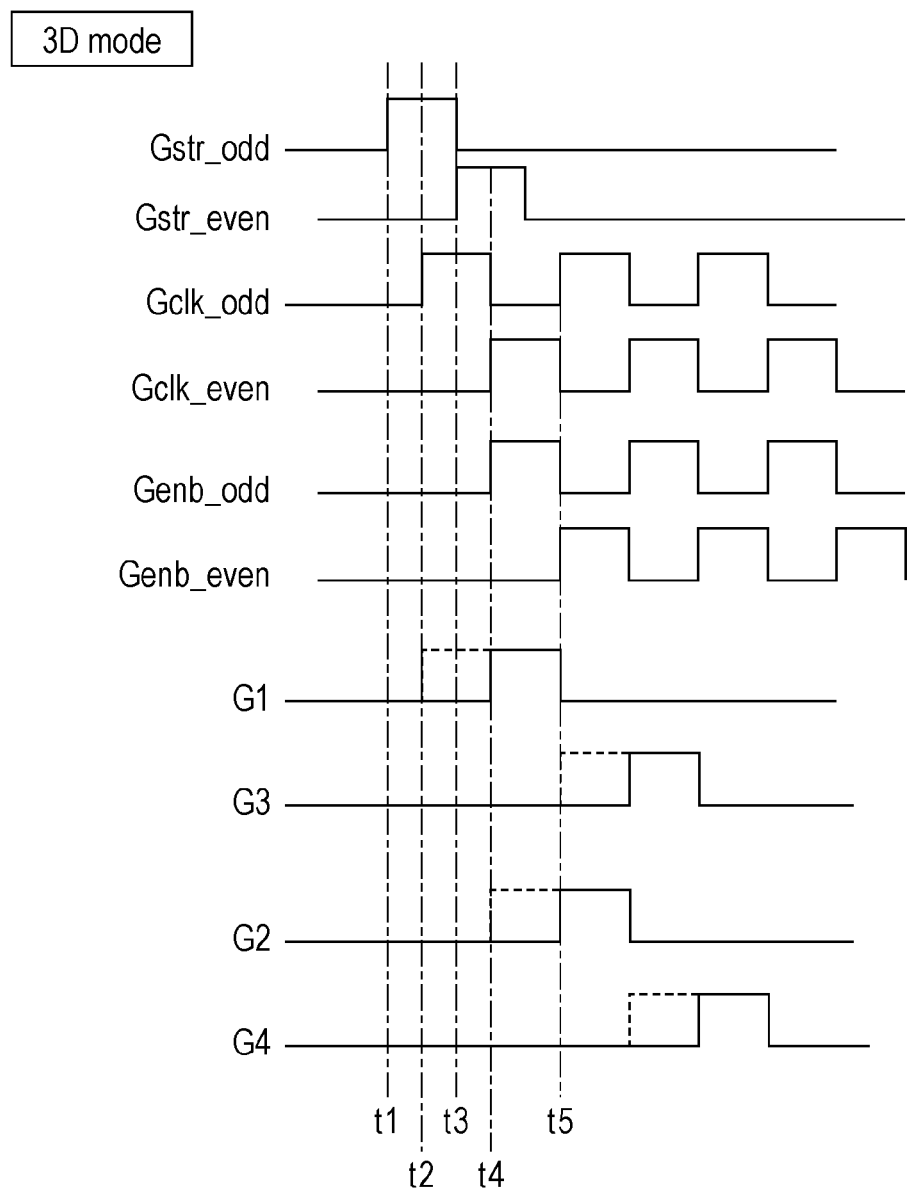
FIG. 30 is a timing chart illustrating the operation of the gate driver in the 3D display mode.

FIG. 29 is a timing chart illustrating the operation of the gate driver 32 in the 2D display mode, and FIG. 30 is a timing chart illustrating the operation of the gate driver 32 in the 3D display mode.

First, a gate pulse output to the gate signal line G1 in the 2D display mode will be described. As illustrated in FIG. 29, when the odd-numbered start pulse signal Gstr_odd rises from a low level (L) to a high level (H) at time t1, a gate pulse that rises from L to H synchronously with the rising edge of the odd-numbered clock signal Gclk_odd that changes from L to H at time t2 within a time period during which the odd-numbered start pulse signal Gstr_odd is H is generated. The high level of the gate pulse is maintained until a gate pulse output from the unit circuit 43 in the subsequent stage rises.

In the case of the 2D display mode, as illustrated in FIG. 29, since the odd-numbered enable signal Genb_odd is always controlled to be H, all the switching elements 45 are always in an on state. Therefore, the gate pulse output from the unit circuit 43 is output to the gate signal line G1 through the corresponding one of the switching elements 45. In the following description, the gate pulse output to the gate signal line Gn is expressed as gate pulse (Gn).

Note that the gate pulse (G3) output from the unit circuit 43 in the subsequent stage rises at the same time as the subsequent rising edge (time t5) of the odd-numbered clock signal Gclk_odd.

Next, the gate pulse (G3) will be described. The unit circuit 43 is set by an H period during which the output of the unit circuit 41 changes from L to H. The gate pulse (G3), which rises from L to H synchronously with the rising edge of the odd-numbered clock signal Gclk_odd at time t5 within the H period and for which the H period is maintained until a gate pulse output from the unit circuit in the subsequent stage rises, is output to the gate signal line G3 through the corresponding one of the switching elements 45.

Subsequently, a gate pulse output to the gate signal lines G2 and G4 corresponding to the gate signal lines Gn+1 in the even-numbered lines with respect to the gate signal lines Gn in the odd-numbered lines will be described.

An even-numbered start pulse signal Gstr_even input to unit circuits 42 and 44 included in the shift register dedicated to the even-numbered lines rises with a delay with respect to the odd-numbered start pulse signal Gstr_odd. Further, the even-numbered clock signal Gclk_even is input to the unit circuits 42 and 44 with a delay of half the clock cycle with respect to the odd-numbered clock signal Gclk_odd. Hence, the polarity of the even-numbered clock signal Gclk_even is opposite to the polarity of the odd-numbered clock signal Gclk_odd.

When the even-numbered start pulse signal Gstr_even rises from L to H at time t3 (>time t1), a gate pulse (G2) that rises from L to H synchronously with the rising edge of the even-numbered clock signal Gclk_even that changes from L to H at time t4 within a time period during which the even-numbered start pulse signal Gstr_even is H is generated. The high level of the gate pulse (G2) is maintained until a gate pulse (G4) output from the unit circuit 44 in the subsequent stage rises.

In the case of the 2D display mode, since the even-numbered enable signal Genb_even is always controlled to be H, all switching elements 46 are always in an on state. Therefore, the gate pulse (G2) is output to the gate signal line G2 through the corresponding one of the switching elements 46.

In this way, in the 2D display mode, the pulse periods of gate pulses are controlled so that the gate pulse (G2) rises in the H period of the gate pulse (G1) and furthermore the gate pulse (G1) falls in the H period of the gate pulse (G2). Thus, the pulse period of the gate pulse (G1) and the pulse period of the gate pulse (G2) partially overlap. In the example in FIG. 29, the overlapping period of the pulse periods is from t5 to t4.

(Operation of Gate Driver to 3D Display Mode)

In contrast, in the 3D display mode, as illustrated in FIG. 30, the generation timings of the odd-numbered start pulse signal Gstr_odd, the odd-numbered clock signal Gclk_odd, the even-numbered start pulse signal Gstr_even, and the even-numbered clock signal Gclk_even are completely the same as those in the case of the 2D display mode. That is, switching between the 2D display mode and the 3D display mode is made using a simple control method of changing only the odd-numbered enable signal Genb_odd and the even-numbered enable signal Genb_even.

More specifically, as illustrated in FIG. 30, the odd-numbered enable signal Genb_odd rises with a delay of half the clock cycle (time t4) with respect to the first rising edge of the odd-numbered clock signal Gclk_odd (time t2), and, after that, the inversion between L and H is repeated at the same intervals as those of the odd-numbered clock signal Gclk_odd.

Similarly, the even-numbered enable signal Genb_even rises with a delay of half the clock cycle (time t5) with respect to the first rising edge (time t4) of the even-numbered clock signal Gclk_even, and, after that, the inversion between L and H is repeated at the same intervals as those of the even-numbered clock signal Gclk_even.

Accordingly, the switching elements 45 and 46 are turned off in the first half of the H period of each of the gate pulses output in the 2D display mode. Thus, a 3D display mode gate pulse whose H period is in the second half of the H period of each of the gate pulses output in the 2D display mode is generated.

In the timing charts illustrated in FIGS. 29 and 30, in a period during which the H period of the gate pulse (G1) and the H period of the gate pulse (G2) overlap in the 2D display mode, the timings of the respective start pulse signals, the respective clock signals, and the respective enable signals are controlled in the 3D display mode, and the pulse periods of the respective gate pulses are controlled accordingly. That is, the timings described above are controlled so that no overlap occurs between the H period of the gate pulse (G1) and the H period of the gate pulse (G2) by making the gate pulse (G2) become L.

Modification Example of Embodiment 1

Figure 32:
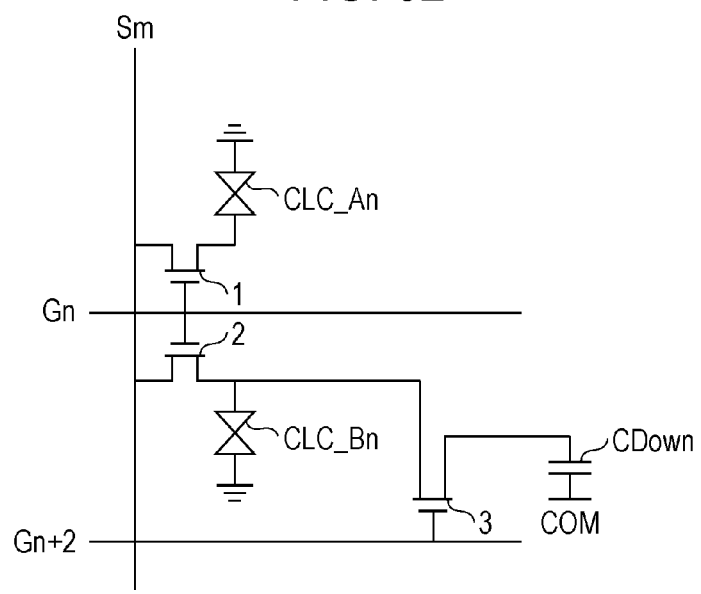
FIG. 32 is a circuit diagram illustrating a modification example of the basic pixel circuit illustrated in FIG. 1.

FIG. 32 is a circuit diagram illustrating a modification example of the basic pixel circuit illustrated in FIG. 1. Only the difference between the circuit diagram in FIG. 32 and that in FIG. 1 is that a control capacitor CDown (first control capacitor) is connected between the pixel electrode of, for example, the sub-pixel R2 among the two sub-pixels R1 and R2 and a common signal line COM through a TFT 3 (first switching element) whose gate electrode is connected to the gate signal line Gn+2. Note that a gate pulse for selecting the pixels in the (n+2)-th line is supplied to the gate signal line Gn+2.

In a driving method according to this modification example, the gate signal line Gn+2 in the (n+2)-th line is not restrictively used, and the gate signal line Gn+i in the (n+i)-th line (i is an integer greater than or equal to 2) may be used.

In accordance with the modification of the configuration of the pixel circuit from the configuration illustrated in FIG. 1 to the configuration illustrated in FIG. 32, the waveforms of the gate pulses are also modified.

Figure 31:
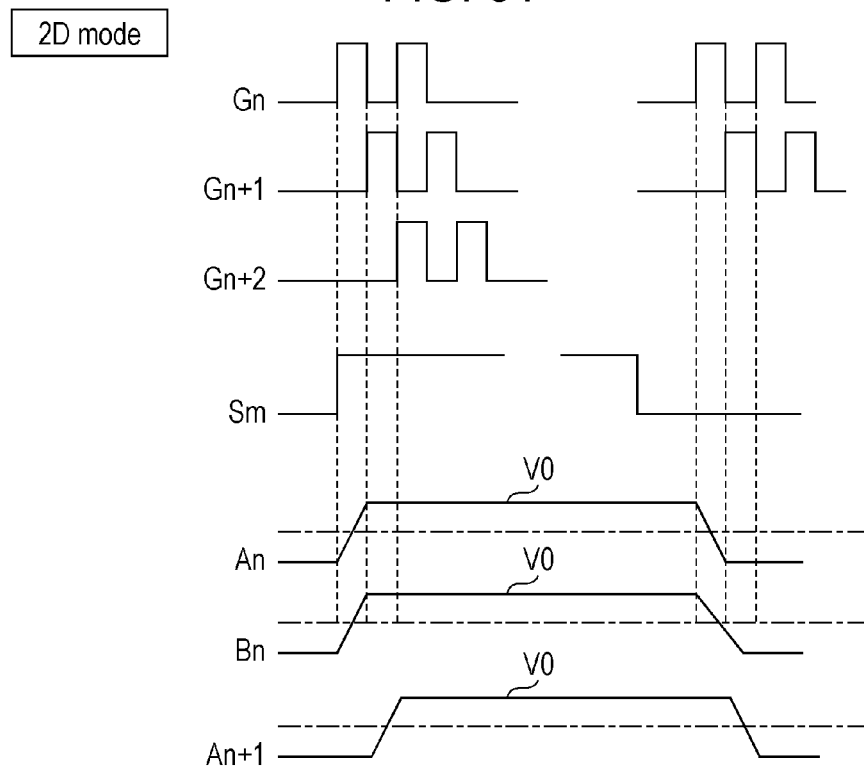
FIG. 31 is a timing chart illustrating the waveforms of gate pulses, signal voltages, and voltages applied to the respective liquid crystal capacitors in the 2D display mode of a pixel circuit illustrated in FIG. 32.
Figure 33:
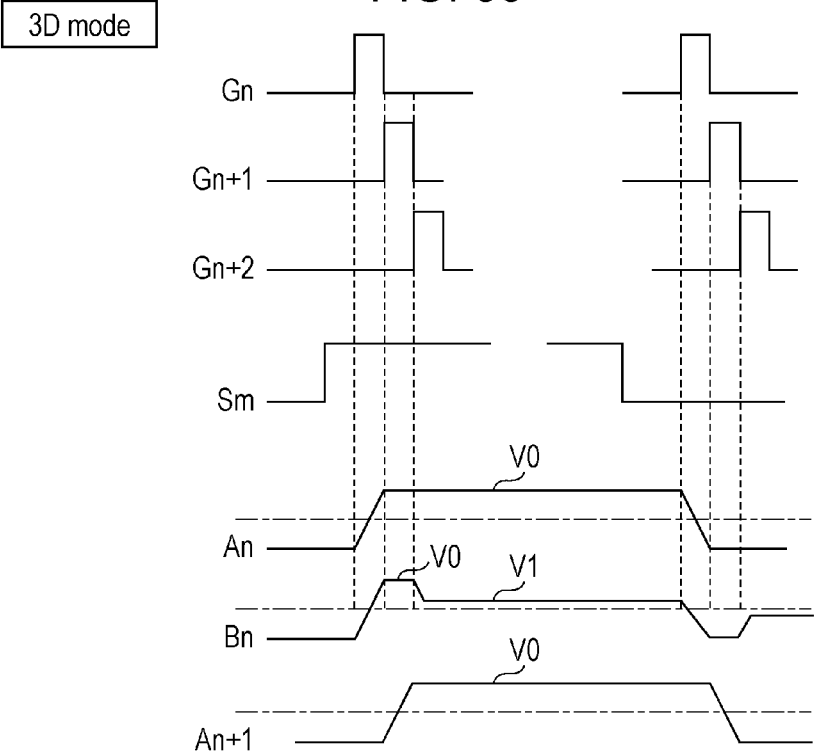
FIG. 33 is a timing chart illustrating the waveforms of gate pulses, signal voltages, and voltages applied to the respective liquid crystal capacitors in the 3D display mode of the pixel circuit illustrated in FIG. 32.

FIG. 31 is a timing chart illustrating the waveforms of gate pulses, signal voltages, and voltages applied to the respective liquid crystal capacitors in the 2D display mode of the pixel circuit illustrated in FIG. 32. FIG. 33 is a timing chart illustrating the waveforms of gate pulses, signal voltages, and voltages applied to the respective liquid crystal capacitors in the 3D display mode of the pixel circuit illustrated in FIG. 32.

In the 2D display mode, as illustrated in FIG. 31, the pulse period of the gate pulse (Gn) is controlled so that the gate pulse (Gn) includes a plurality of periodic pulses, for example, two (or three or four) pulses for one frame period. The two pulses are at a high level in one horizontal scanning period (1H), and an interval of 1H exists therebetween. Each of the gate pulses output to the gate signal lines in the (n+1)-th and subsequent lines is output with a delay of 1H with respect to a gate pulse for the immediately preceding line.

In order to develop the gate pulses described above, in the timing chart in FIG. 29, each of the odd-numbered start pulse signal Gstr_odd and the even-numbered start pulse signal Gstr_even may include two pulses having the timings given below, and each of the frequencies of the odd-numbered clock signal Gclk_odd and the even-numbered clock signal Gclk_even may be increased twice that in FIG. 29. As timings of the two pulses, for example, the rising edge of the second pulse of the odd-numbered start pulse signal Gstr_odd is synchronized with the falling edge of the first pulse of the even-numbered start pulse signal Gstr_even.

Accordingly, the mode switching elements 45 and 46, the odd-numbered enable signal Genb_odd, and the even-numbered enable signal Genb_even can be omitted regardless of the 2D or 3D display mode. Therefore, the configuration and operation of the gate driver 32 and the external driving circuit 34 can further be simplified.

That is, a general-purpose gate driver including normal shift registers can be used as the gate driver 32. Therefore, it is possible to avoid an increase in circuit size and an increase in cost, which may be caused by the modification of the configuration of the gate driver.

The change in the effective voltage across the liquid crystal capacitors CLC_An and CLC_Bn and the normal sub-pixel R1 and the specific sub-pixel R2 is not different from that in the timing chart illustrated in FIG. 4. The reason for this is that in the 2D display mode, instead of partial overlapping of the pulse periods of the gate pulse (Gn) and the gate pulse (Gn+1) in FIG. 4, in FIG. 31, the pulse period of the second pulse of the gate pulse (Gn) and the pulse period of the first pulse of the gate pulse (Gn+2) are made to overlap.

In a case where each gate pulse includes three or more pulses, there may be an overlapping period between the pulse period of any of the second and subsequent pulses of the gate pulse (Gn) and the pulse period of any of the first and subsequent pulses of the gate pulse (Gn+2).

That is, a signal voltage is written from the source signal line Sm to the liquid crystal capacitors CLC_An and CLC_Bn during the pulse period of the first pulse of the gate pulse (Gn). At this time, the gate pulse (Gn+2) has been at a low level. Thus, the TFT 3 is turned off, resulting in no charge being distributed to the control capacitor CDown.

Further, a signal voltage is sufficiently written from the source signal line Sm to the liquid crystal capacitors CLC_An and CLC_Bn in the pulse periods of the second and subsequent pulses of the gate pulse (Gn). At this time, the pulse periods overlap the pulse periods of the first and subsequent pulses of the gate pulse (Gn+2). Thus, the TFT 3 is turned on, resulting in the signal voltage being also written to the control capacitor CDown. In this condition, the effective voltage across the liquid crystal capacitor CLC_Bn of the specific sub-pixel R2 does not change and is kept at the same value (V0).

In contrast, as illustrated in FIG. 33, in the 3D display mode, gate pulses each having one pulse are sequentially output to the gate signal lines in the respective lines at times shifted by 1H.

As a result of the gate pulse (Gn) being at a low level in the pulse period of the gate pulse (Gn+2), the charge written to the liquid crystal capacitor CLC_Bn is redistributed between the liquid crystal capacitor CLC_Bn and the control capacitor CDown in the pulse period of the gate pulse (Gn+2). As a result, the effective voltage across the liquid crystal capacitor CLC_Bn is kept at V0 until the gate pulse (Gn+2) rises, and drops to V1 after the gate pulse (Gn+2) rises.

Accordingly, for example, in the normally black mode, it is possible to allow the specific sub-pixel R2 to perform black display, and to create the state where the second sub-pixel row in which the specific sub-pixel R2 is arranged in the horizontal direction functions as a black stripe.

The gate pulses illustrated in FIGS. 31 and 33 are applicable not only to Embodiment 1 but to all the embodiments described below as well.

Embodiment 2

Another embodiment of the present invention will be described hereinafter with reference to FIGS. 7 to 11. For convenience of illustration, the same components as those in the foregoing embodiment are assigned the same numerals, and a detailed description thereof is omitted.

(Overview of Difference from Embodiment 1)

Figure 11:
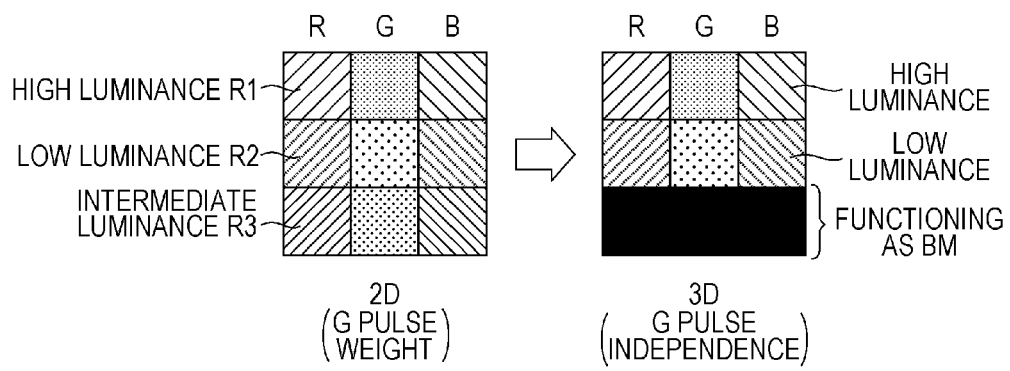
FIG. 11 is an explanatory diagram illustrating an example configuration of pixels in a liquid crystal display device according to Embodiment 2.

FIG. 11 is an explanatory diagram illustrating an example configuration of pixels in a liquid crystal display device according to this embodiment. A liquid crystal display device described in Embodiment 2 and the following embodiments has a configuration in which the configuration according to Embodiment 1 and a multi-pixel structure (MPD structure: Multi Pixel Drive structure), which is suitable for use in a VA mode or TN mode liquid crystal display device, are used in combination.

More specifically, for example, as indicated by sub-pixels R1 to R3 in FIG. 11, the number of sub-pixels per pixel is greater than or equal to three, and the number of normal sub-pixels (for example, R1 and R2) other than a specific sub-pixel (for example, R3) functioning as a black stripe is greater than or equal to two. Additionally, a pixel circuit provided for each of a plurality of sub-pixels has a configuration in which a potential difference is generated between the normal sub-pixels at least in the 3D display mode so that the normal sub-pixels are divided into a relatively-high-luminance sub-pixel and a low-luminance sub-pixel in response to the writing of a source signal.

Accordingly, as illustrated in FIG. 11, at least in the 3D display mode, for example, after the sub-pixels R1 to R3 are simultaneously selected, a potential difference is generated between the sub-pixels R1 and R2. That is, the normal sub-pixel R1 exhibiting a relatively high light transmittance and the normal sub-pixel R2 exhibiting a relatively low light transmittance are generated in response to the writing of the same signal voltage. In other words, the degree of inclination (alignment) of the liquid crystal molecules differs between the normal sub-pixels in response to the writing of the same signal voltage.

As a result, a wide viewing angle can be realized in the 3D display mode. The reason for this is that the view-angle dependence of the γ characteristics of a liquid crystal display device (the difference between the γ characteristics obtained when observed from front and the γ characteristics obtained when observed obliquely) can be improved by diversifying the degree of inclination of liquid crystal molecules in each pixel.

(Configuration of Pixel Circuit)

Figure 7:
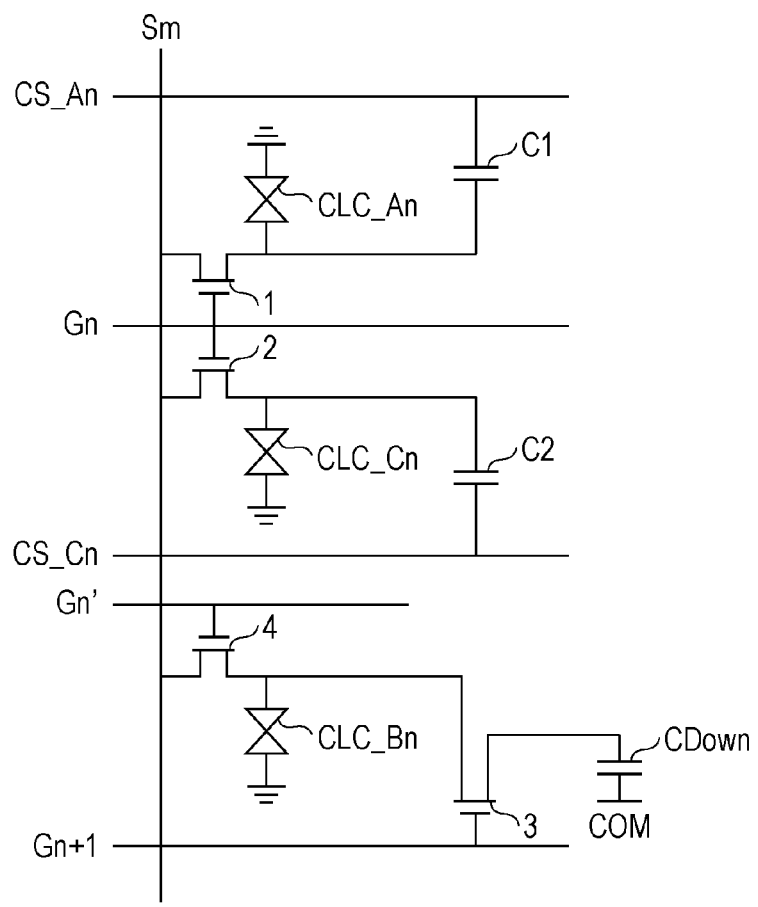
FIG. 7 is a circuit diagram illustrating the equivalent circuit of, for example, an R pixel among the pixels illustrated in FIG. 11 according to Embodiment 2.
Figure 8:
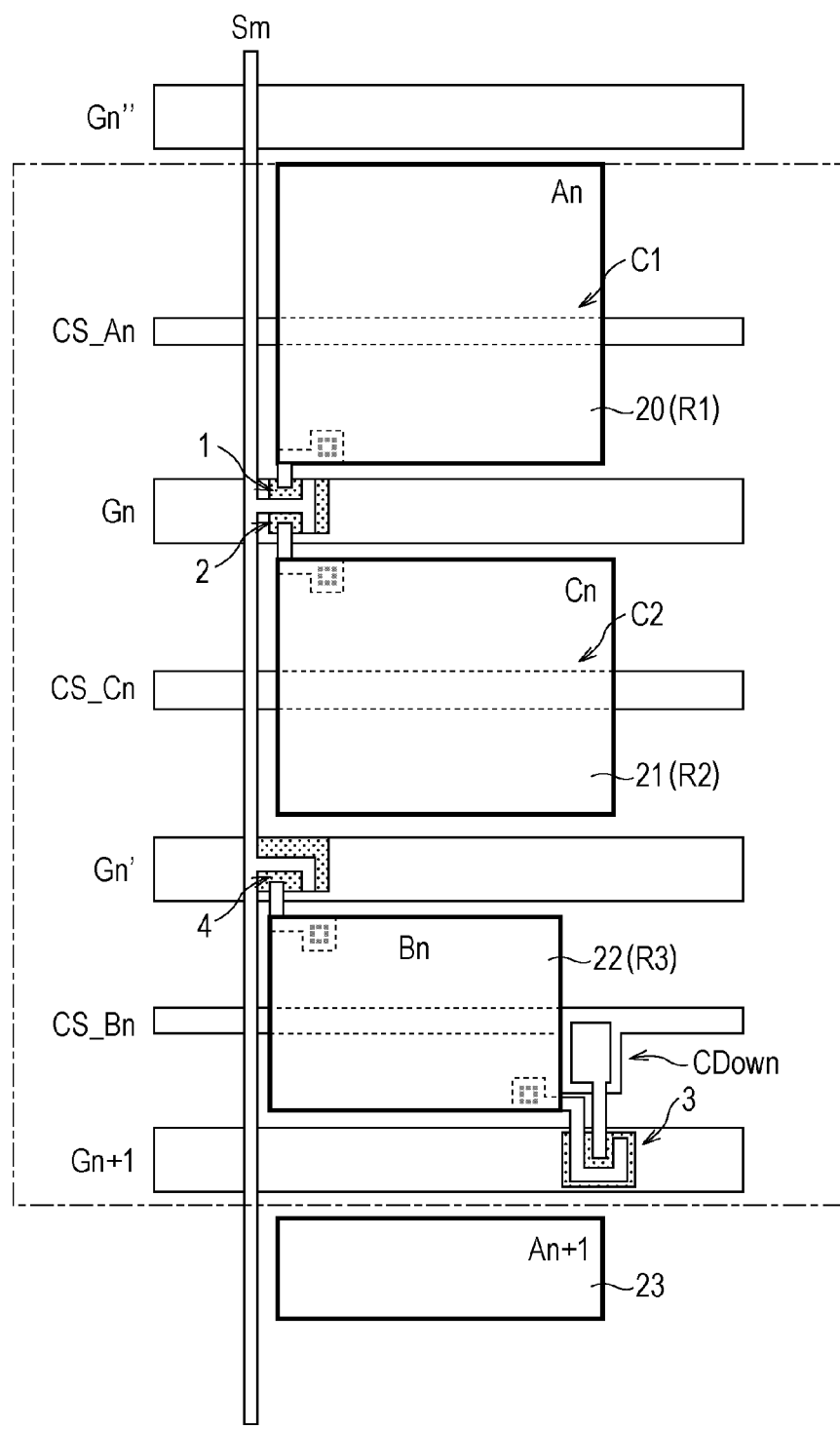
FIG. 8 is a plan view illustrating a schematic layout of the pixel circuit illustrated in FIG. 7 on an active matrix substrate.

FIG. 7 is a circuit diagram illustrating the equivalent circuit of, for example, the R pixel among the pixels illustrated in FIG. 11. FIG. 8 is a plan view illustrating a schematic layout of the pixel circuit illustrated in FIG. 7 on an active matrix substrate.

First, a description will be given of a case where the number of gate signal lines to which gate pulses are simultaneously supplied in the pixels in the n-th line is three with reference to FIG. 8. One of the three gate signal lines is a gate signal line Gn for selecting the normal sub-pixels R1 and R2. Another of the three gate signal lines is a gate signal line Gn' for selecting the specific sub-pixel R3 simultaneously with the selection of the normal sub-pixels R1 and R2. The other of the three gate signal lines is a gate signal line Gn" for turning on the TFTs connected to the control capacitors in the specific sub-pixels in the pixels in the (n−1)-th line.

As described previously, preferably, the single gate signal line Gn for selecting the pixels in the n-th line branches in the pixels into the gate signal line Gn' and the gate signal line Gn".

The gate signal line Gn" is included in the components of the pixel circuits in the (n−1)-th line. As illustrated in FIG. 8, a gate signal line Gn+1 having functions equivalent to those of the gate signal line Gn" is provided as a component of the pixel circuit in the n-th line.

The liquid crystal capacitor included in the normal sub-pixel R1 illustrated in FIG. 11 is represented by a liquid crystal capacitor CLC_An, the liquid crystal capacitor included in the normal sub-pixel R2 is represented by a liquid crystal capacitor CLC_Cn, and the liquid crystal capacitor included in the specific sub-pixel R3 is represented by a liquid crystal capacitor CLC_Bn. A pixel electrode of the liquid crystal capacitor CLC_An is connected to the source signal line Sm through a TFT 1 whose gate electrode is connected to the gate signal line Gn. Similarly, a pixel electrode of the liquid crystal capacitor CLC_Cn is connected to the source signal line Sm through a TFT 2 whose gate electrode is connected to the gate signal line Gn. Further, a pixel electrode of the liquid crystal capacitor CLC_Bn is connected to the source signal line Sm through a TFT 4 whose gate electrode is connected to the gate signal line Gn'.

Accordingly, the normal sub-pixels R1 and R2 and the specific sub-pixel R3 are simultaneously selected by outputting an n-th-stage gate pulse to the gate signal lines Gn and Gn'.

Additionally, a control capacitor CDown is connected between a pixel electrode of the specific sub-pixel R3 and the common signal line COM through a TFT 3 whose gate electrode is connected to the gate signal line Gn+1. The common signal line COM may be the same as a holding capacitor line having the same potential as a common electrode.

Incidentally, the normal sub-pixel R1 includes a holding capacitor line CS_An (first holding capacitor line) for, along with the pixel electrode of the liquid crystal capacitor CLC_An, forming a holding capacitor C1, and the normal sub-pixel R2 includes a holding capacitor line CS_Cn (second holding capacitor line) for, along with the pixel electrode of the liquid crystal capacitor CLC_Cn, forming a holding capacitor C2, as a configuration for generating a potential difference between the normal sub-pixels R1 and R2 in response to the writing of a source signal.

In the 2D display mode and the 3D display mode, holding capacitor control signals of opposite phases are applied to the holding capacitor line CS_An and the holding capacitor line CS_Cn so that a potential difference (luminance difference) is generated between the normal sub-pixel R1 and the normal sub-pixel R2.

(Layout of Pixel Circuit)

A supplementary discussion will be given of the layout illustrated in FIG. 8. The gate signal line Gn", the gate signal line Gn, the gate signal line Gn', and the gate signal line Gn+1 are wired at certain intervals in this order in the direction in which the source signal line Sm extends. The direction from the gate signal line Gn" to the gate signal line Gn+1 is equal to the direction from the (n−1)-th line to the (n+1)-th line.

A pixel electrode 20 of the liquid crystal capacitor CLC_An is disposed between the gate signal line Gn" and the gate signal line Gn, a pixel electrode 21 of the liquid crystal capacitor CLC_Cn is disposed between the gate signal line Gn and the gate signal line Gn', and a pixel electrode 22 of the liquid crystal capacitor CLC_Bn is disposed between the gate signal line Gn' and the gate signal line Gn+1.

The holding capacitor line CS_An is wired in parallel to the gate signal line Gn in a layer below the pixel electrode 20 and the source signal line Sm, and the holding capacitor line CS_Cn is wired in parallel to the gate signal line Gn in a layer below the pixel electrode 21 and the source signal line Sm. Further, a holding capacitor line CS_Bn whose potential is kept at the same level as that of the common electrode is wired in parallel to the gate signal line Gn+1 in a layer below the pixel electrode 22 and the source signal line Sm.

The layout of the TFTs 1, 2, and 4 is similar to the layout of the TFTs 1 and 2 described with reference to FIG. 3, and the layout of the TFT 3 is similar to the layout of the TFT 3 described with reference to FIG. 3, which will not be described.

(Driving Example in 2D Display Mode)

Figure 9:
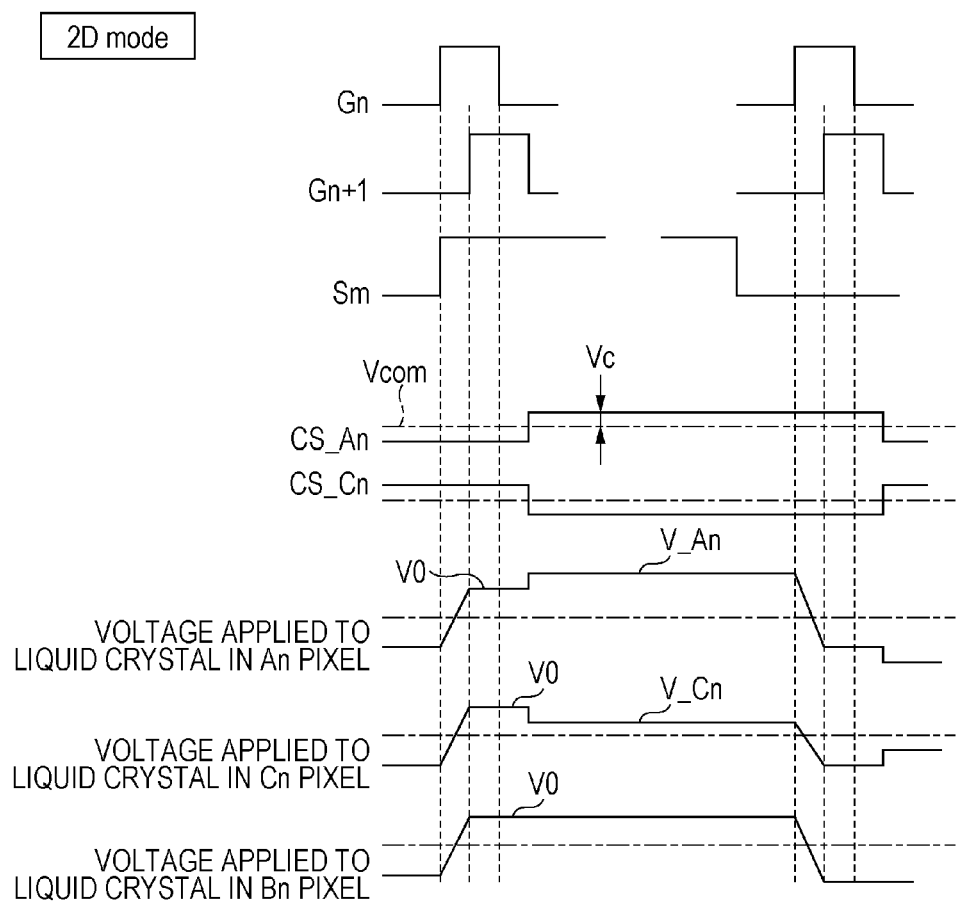
FIG. 9 is a timing chart illustrating the waveforms of gate pulses, signal voltages, and voltages applied to the respective liquid crystal capacitors in the 2D display mode according to Embodiment 2.

FIG. 9 is a timing chart illustrating the waveforms of gate pulses, signal voltages, and voltages applied to the respective liquid crystal capacitors in the 2D display mode.

As illustrated in FIG. 9, in the 2D display mode, when an n-th-stage gate pulse is output to the gate signal lines Gn and Gn', the normal sub-pixels R1 and R2 and the specific sub-pixel R3 are simultaneously selected. Accordingly, the same signal voltage is written to the liquid crystal capacitors CLC_An and the CLC_Cn of the normal sub-pixels R1 and R2 and to the liquid crystal capacitor CLC_Bn of the specific sub-pixel R3 through the source signal line Sm. Thus, the effective voltage across the liquid crystal capacitor CLC_An and CLC_Cn with respect to the common signal line COM becomes equal to the effective voltage V0.

Then, when an (n+1)-th-stage gate pulse is output to the gate signal line Gn+1, since the pulse period of the (n+1)-th-stage gate pulse partially overlaps the pulse period of the n-th-stage gate pulse, the TFT 3 is turned on in a time period during which the sub-pixels R1 to R3 are selected. As a result, the signal voltage described above is written to the control capacitor CDown connected to the pixel electrode of the specific sub-pixel R3 through the TFT 3. In this condition, the effective voltage across the liquid crystal capacitor CLC_Bn of the specific sub-pixel R3 does not change and is still at the same value (V0).

Meanwhile, when a holding capacitor control signal is applied to the holding capacitor line CS_An and an effective voltage VC1 across the holding capacitor C1 of the normal sub-pixel R1 becomes equal to Vcom+Vc in the manner illustrated in FIG. 9, an effective voltage V_An across the liquid crystal capacitor CLC_An is given by $V\_An = V0 + 2 \times K1 \times Vc,$ where $K1 = C1/(CLC\_An + C1)$.

Further, when a holding capacitor control signal of an opposite phase to that of the holding capacitor control signal described above is applied to the holding capacitor line CS_Cn and a voltage VC2 across the holding capacitor C2 of the normal sub-pixel R2 becomes equal to Vcom−Vc, an effective voltage V_Cn across the liquid crystal capacitor CLC_Cn is given by $V\_Cn = V0 - 2 \times K2 \times Vc,$ where $K2 = C2/(CLC\_Cn + C2)$.

In this way, the effective voltage of the normal sub-pixel R1 is maximized, and the effective voltage of the normal sub-pixel R2 is minimized. The effective voltage of the specific sub-pixel R3 has an intermediate level between them.

Therefore, as illustrated in FIG. 11, in the 2D display mode, for example, the R pixel can be separated into the normal sub-pixel R1 having a high luminance, the normal sub-pixel R2 having a minimum luminance, and the specific sub-pixel R3 having an intermediate luminance. The relationship in magnitude between the luminance values Y(R1), Y(R2), and Y(R3) may be either Y(R1)>Y(R3)>Y(R2) or Y(R1)<Y(R3)<Y(R2). As a result, the viewing angle can be the widest in all the embodiments, and it is possible to provide 2D display that is improved over an MPD structure of the related art.

(Driving Example in 3D Display Mode)

Figure 10:
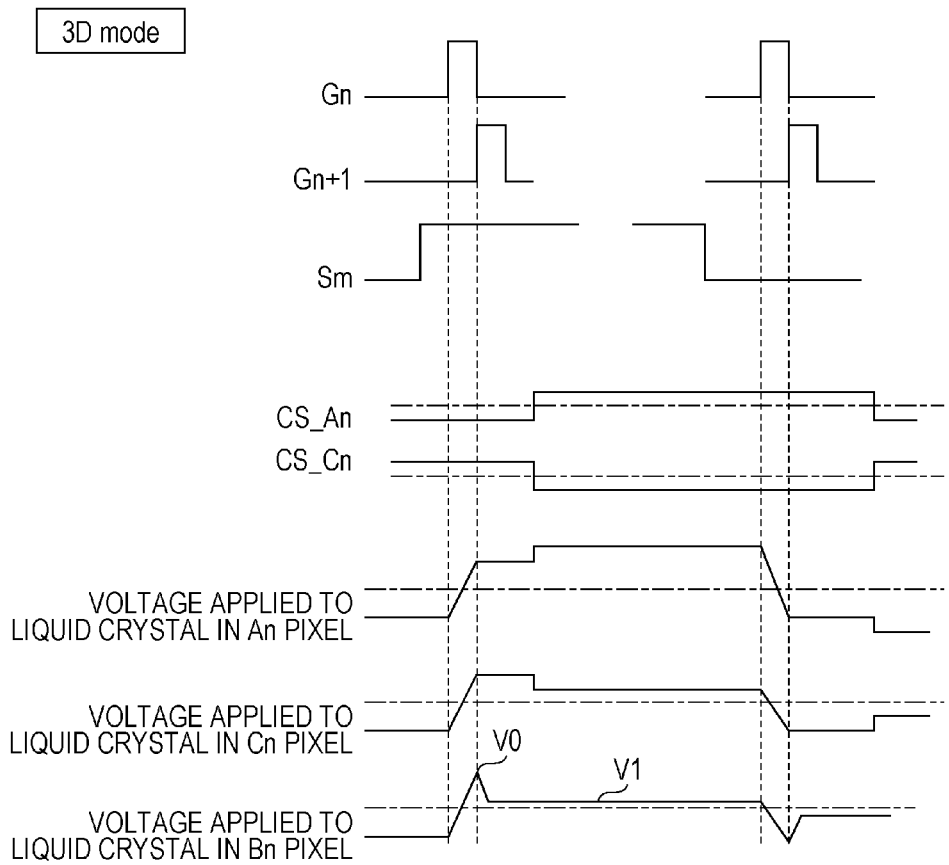
FIG. 10 is a timing chart illustrating the waveforms of gate pulses, signal voltages, and voltages applied to the respective liquid crystal capacitors in the 3D display mode according to Embodiment 2.

In the 3D display mode, as illustrated in FIG. 10, the effective voltage V_An across the liquid crystal capacitor CLC_An and the effective voltage V_Cn across the liquid crystal capacitor CLC_Cn are not different from those in the case of the 2D display mode.

Further, as described in Embodiment 1, the effective voltage across the liquid crystal capacitor CLC_Bn of the specific sub-pixel R3 drops from the effective voltage V0 to the effective voltage V1 when an (n+1)-th-stage gate pulse is output to the gate signal line Gn+1.

In the 3D display mode, therefore, as described previously, the luminance of the specific sub-pixel R3 can be made dark to such an extent that the specific sub-pixel R3 functions as a black stripe, by the setting of the value of the control capacitor CDown, in response to the writing of the same signal voltage, and the normal sub-pixel R1 exhibits a high luminance while the normal sub-pixel R2 exhibits a low luminance. Therefore, it is possible to implement 3D display with suppressed crosstalk while increasing the viewing angle characteristics in accordance with the two levels of luminance of the normal sub-pixels R1 and R2.

Embodiment 3

Still another embodiment of the present invention will be described hereinafter with reference to FIGS. 12 to 16. For convenience of illustration, the same components as those in the foregoing embodiments are assigned the same numerals, and a detailed description thereof is omitted.

(Difference from Embodiment 1)

Figure 12:
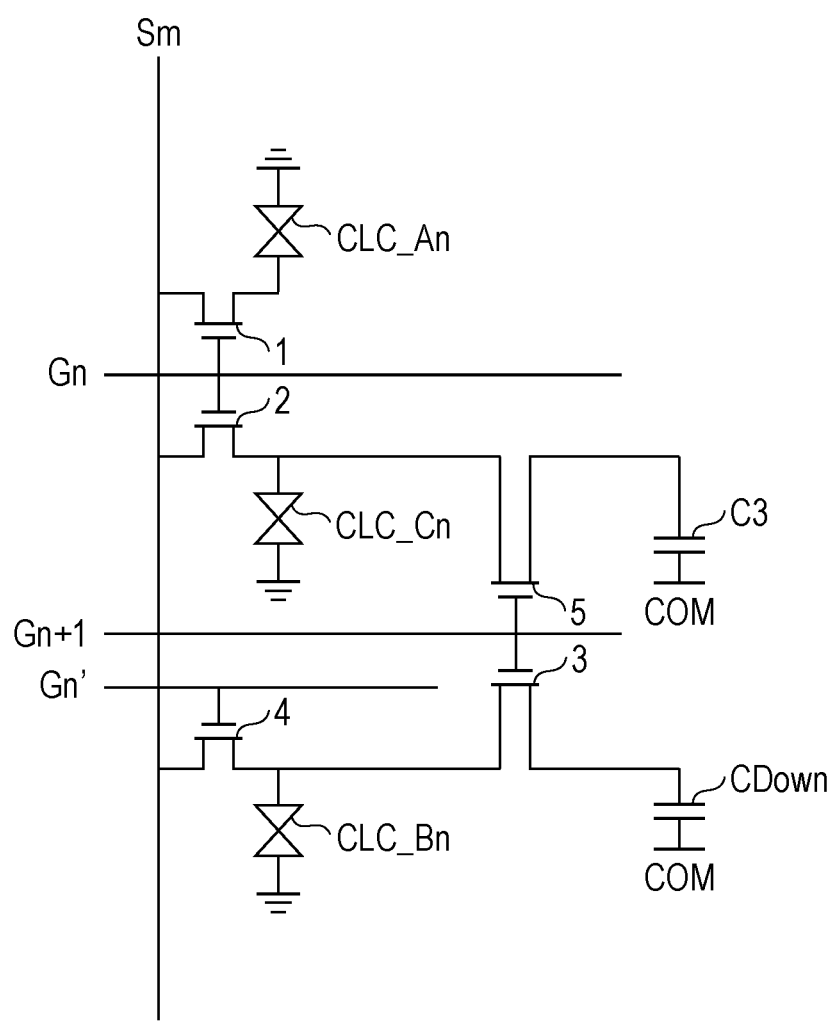
FIG. 12 is a circuit diagram illustrating the equivalent circuit of, for example, an R pixel among pixels illustrated in FIG. 16 according to Embodiment 3.
Figure 16:
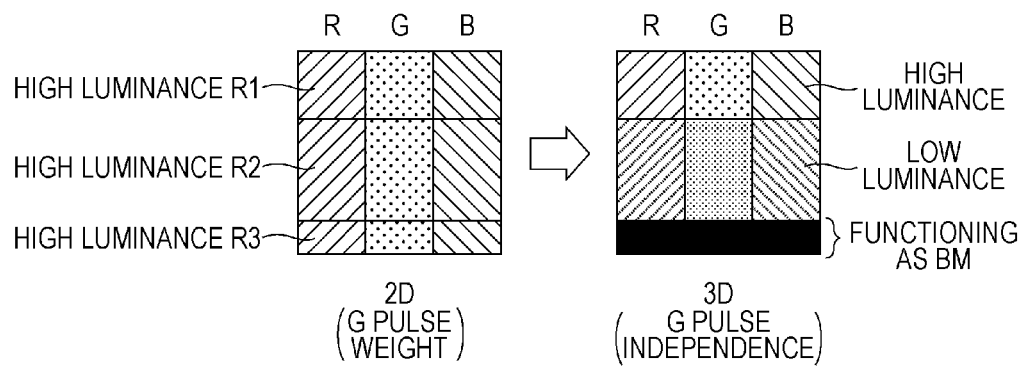
FIG. 16 is an explanatory diagram illustrating an example configuration of pixels in a liquid crystal display device according to Embodiment 3.

FIG. 16 is an explanatory diagram illustrating an example configuration of pixels in a liquid crystal display device according to this embodiment. FIG. 12 is a circuit diagram illustrating the equivalent circuit of, for example, the R pixel among the pixels illustrated in FIG. 16. As illustrated in FIG. 16, the R pixel includes normal sub-pixels R1 and R2 and a specific sub-pixel R3.

As is apparent from the circuit diagram in FIG. 12, in this embodiment, the circuit configuration of the normal sub-pixel R1 and the specific sub-pixel R3 is the same as the circuit configuration in Embodiment 1, and is different from that in Embodiment 1 in that a normal sub-pixel R2 having a circuit configuration equivalent to the circuit configuration of the specific sub-pixel R3 is additionally provided. The configuration of the normal sub-pixel R2 is a configuration in which a potential difference is generated between the normal sub-pixels R1 and R2.

More specifically, in the normal sub-pixel R2, a control capacitor C3 (second control capacitor) is connected between a pixel electrode of the liquid crystal capacitor CLC_Cn and the common signal line COM through a TFT 5 (second switching element) whose gate electrode is connected to the gate signal line Gn+1. The value of the control capacitor C3 is set smaller than the value of the control capacitor CDown. More preferably, as described previously, the value of the control capacitor CDown is set large to such an extent that the voltage to be applied to the liquid crystal capacitor CLC_Bn is less than or equal to a threshold value in the 3D display mode, while the value of the control capacitor C3 is set large to such an extent that a signal voltage of, for example, 4 V drops by approximately 1 to 2 V.

(Layout of Pixel Circuit)

Figure 13:
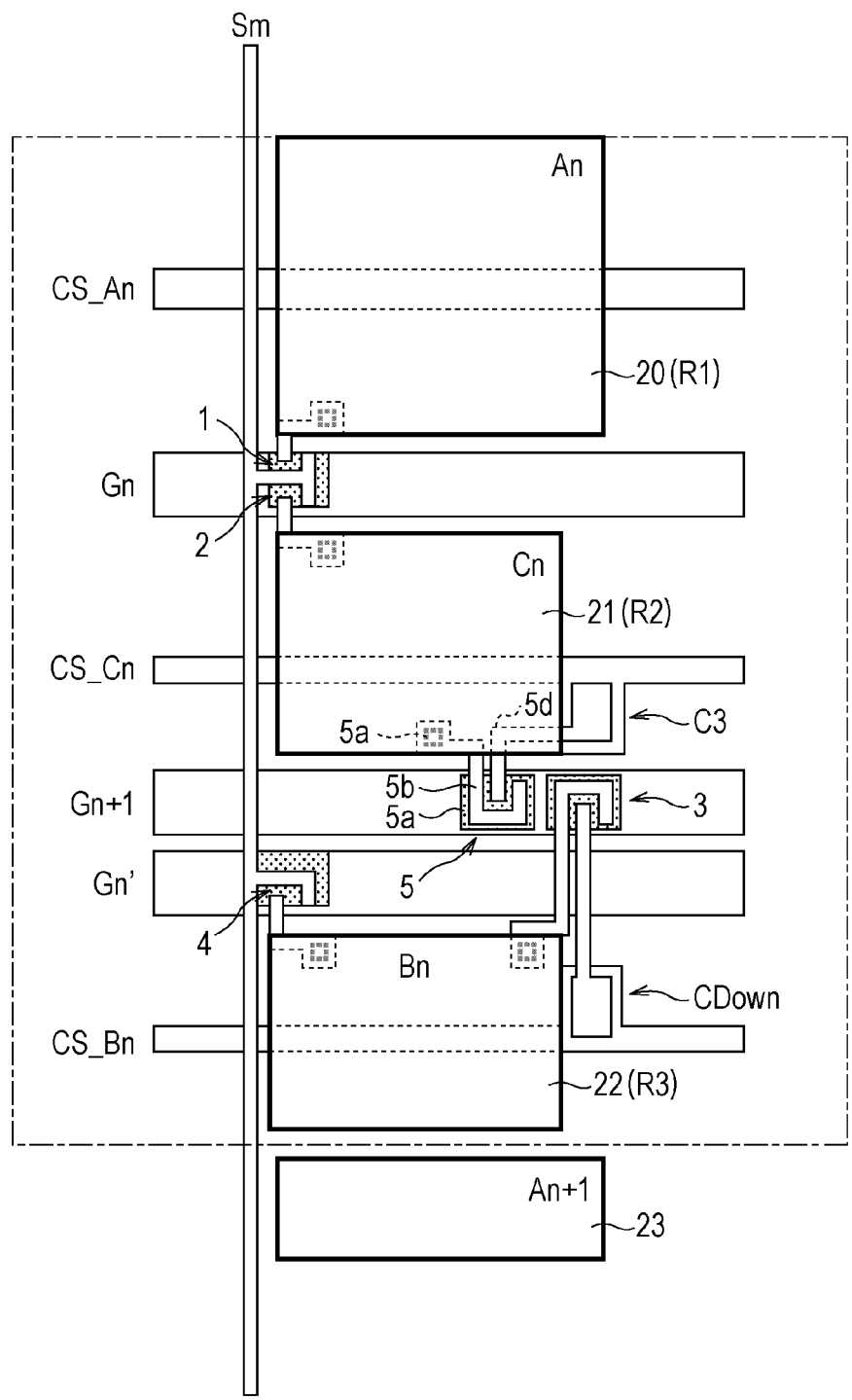
FIG. 13 is a plan view illustrating a schematic layout of the pixel circuit illustrated in FIG. 12 on an active matrix substrate.

FIG. 13 is a plan view illustrating a schematic layout of the pixel circuit illustrated in FIG. 12 on an active matrix substrate.

The difference from the layout illustrated in FIG. 8 will be described. First, a gate signal line Gn+1 is wired in parallel to the gate signal line Gn' between the pixel electrode 21 of the liquid crystal capacitor CLC_Cn and the gate signal line Gn'.

The TFT 3 and the TFT 5 are disposed side by side on the gate signal line Gn+1. One electrode 5$b$ of the TFT 5 extends to below the pixel electrode 21 from a semiconductor region 5$a$ on the gate signal line Gn+1, and is connected to the pixel electrode 21 through a through-hole 5$c$. Further, the other electrode 5$d$ of the TFT 5 extends onto a holding capacitor line CS_Cn from the semiconductor region 5$a$, and the control capacitor C3 is formed between the electrode 5$d$ and an electrode extending toward the gate signal line Gn+1 from the holding capacitor line CS_Cn.

(Driving Example in 2D Display Mode)

Figure 14:
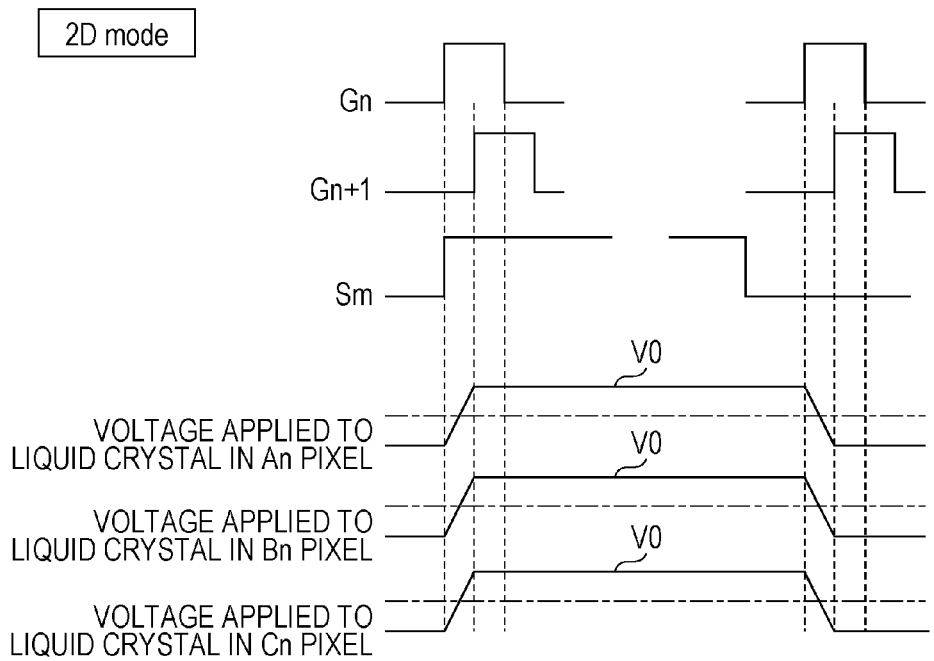
FIG. 14 is a timing chart illustrating the waveforms of gate pulses, signal voltages, and voltages applied to the respective liquid crystal capacitors in the 2D display mode according to Embodiment 3.

FIG. 14 is a timing chart illustrating the waveforms of gate pulses, signal voltages, and voltages applied to the respective liquid crystal capacitors in the 2D display mode.

As illustrated in FIG. 14, in the 2D display mode, since the pulse period of the n-th-stage gate pulse and the pulse period of the (n+1)-th-stage gate pulse overlap, the TFTs 3 and 5 are turned on by the (n+1)-th-stage gate pulse in a time period during which the sub-pixels R1 to R3 are selected by the n-th-stage gate pulse, and a signal voltage is written to the two control capacitors CDown and C3.

Therefore, as already described, when the n-th-stage gate pulse is output to the gate signal lines Gn and Gn', the effective voltage V0, which has been reached in response to the writing of a signal voltage to the liquid crystal capacitors CLC_An, CLC_Bn, and CLC_Cn, is still maintained even after the (n+1)-th-stage gate pulse has been output to the gate signal line Gn+1.

As a result, as illustrated in FIG. 16, in the 2D display mode, all the sub-pixels R1 to R3 have the same luminance (for example, high luminance) in response to the writing of the same signal voltage. Hence, the effect of improvements in viewing angle characteristics is not ascertainable.

(Driving Example in 3D Display Mode)

Figure 15:
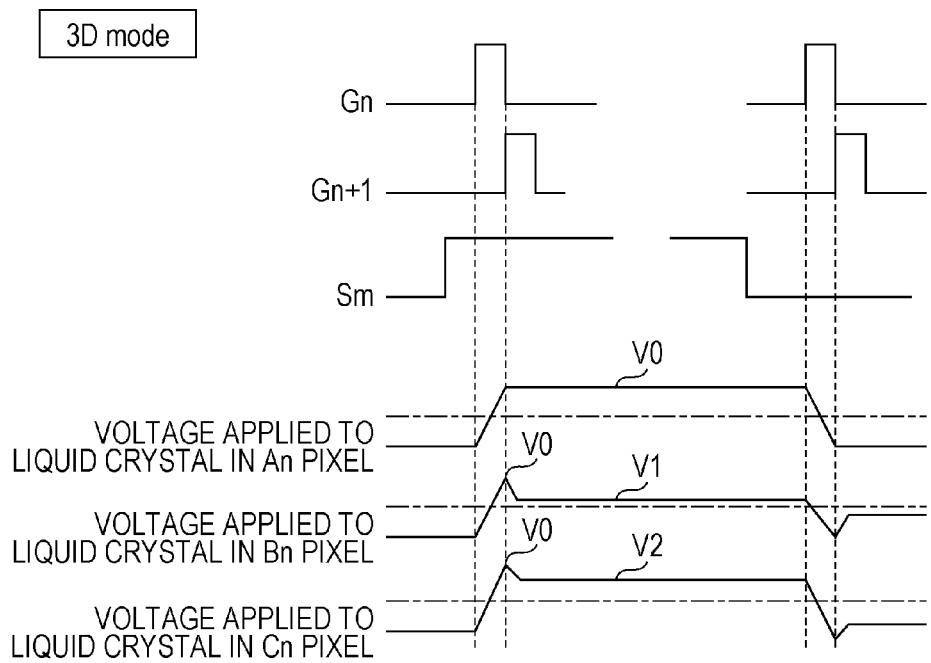
FIG. 15 is a timing chart illustrating the waveforms of gate pulses, signal voltages, and voltages applied to the respective liquid crystal capacitors in the 3D display mode according to Embodiment 3.

FIG. 15 is a timing chart illustrating the waveforms of gate pulses, signal voltages, and voltages applied to the respective liquid crystal capacitors in the 3D display mode.

As illustrated in FIG. 15, in the 3D display mode, since the pulse period of the n-th-stage gate pulse and the pulse period of the (n+1)-th-stage gate pulse do not overlap, the charge accumulated in the liquid crystal capacitors CLC_Bn and CLC_Cn in a time period during which the sub-pixels R1 to R3 are selected by the n-th-stage gate pulse flows into the control capacitor CDown and the control capacitor C3, respectively, at the time when the (n+1)-th-stage gate pulse is output to the gate signal line Gn+1.

That is, the charge accumulated in the liquid crystal capacitor CLC_Bn is redistributed between the liquid crystal capacitor CLC_Bn and the control capacitor CDown, and the charge accumulated in the liquid crystal capacitor CLC_Cn is redistributed between the liquid crystal capacitor CLC_Cn and the control capacitor C3.

As a result, as illustrated in FIG. 15, the effective voltage across the liquid crystal capacitor CLC_Bn drops from the effective voltage V0 to the effective voltage V1 described above, which is represented by the following formula.

$$V1 = V0 \times CLC\_Bn/(CLC\_Bn + CDown)$$

Similarly, the effective voltage across the liquid crystal capacitor CLC_Cn drops from the effective voltage V0 to an effective voltage V2 represented by the following formula.

$$V2 = V0 \times CLC\_Cn/(CLC\_Cn + C3)$$

Therefore, the relationship V1<V2 is obtained for the relationship CDown>C3.

In this way, as illustrated in FIG. 16, appropriately setting the values of CDown and C3 allows the normal sub-pixel R1 to exhibit a high luminance and the normal sub-pixel R2 to exhibit a luminance lower than that of the normal sub-pixel R1 in response to the writing of the same signal voltage, whereas, the luminance of the specific sub-pixel R3 can be made dark to such an extent that the specific sub-pixel R3 functions as a black stripe.

Accordingly, it is possible to implement 3D display with suppressed crosstalk while increasing the viewing angle characteristics in accordance with the two levels of luminance of the normal sub-pixels R1 and R2.

Embodiment 4

Still another embodiment of the present invention will be described hereinafter with reference to FIGS. 17 to 20. For convenience of illustration, the same components as those in the foregoing embodiments are assigned the same numerals, and a detailed description thereof is omitted.

(Difference from Embodiment 1)

The example configuration illustrated in FIG. 16 can be applied to the configuration of a pixel in a liquid crystal display device according to this embodiment.

Figure 17:
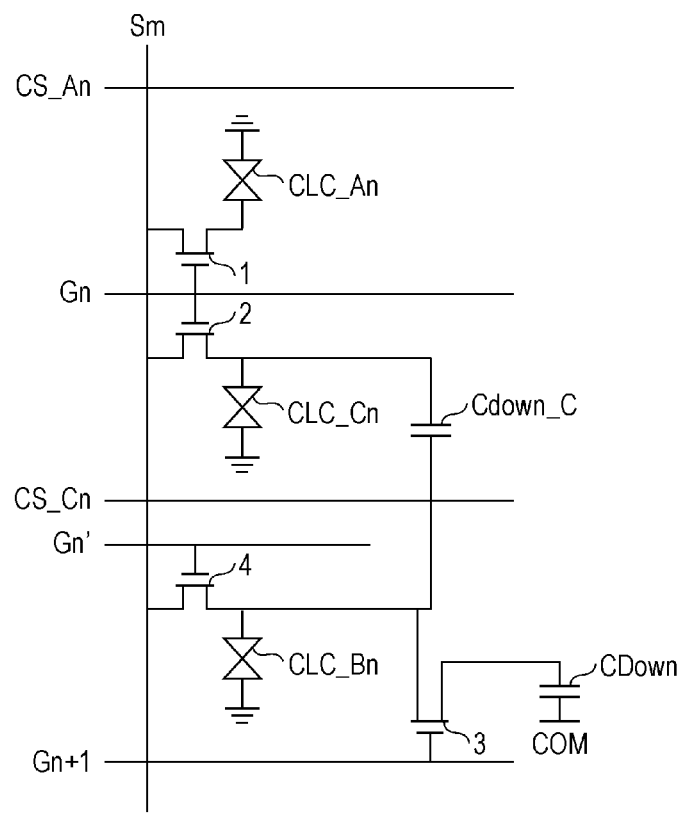
FIG. 17 is a circuit diagram illustrating the equivalent circuit of, for example, an R pixel in the pixels illustrated in FIG. 16 according to Embodiment 4.

FIG. 17 is a circuit diagram illustrating the equivalent circuit of, for example, the R pixel among the pixels illustrated in FIG. 16. As is apparent from the circuit diagram in FIG. 17, in this embodiment, the circuit configuration of the normal sub-pixel R1 and the specific sub-pixel R3 is the same as the circuit configuration in Embodiment 1, and is different from that in Embodiment 1 in that a normal sub-pixel R2 including a liquid crystal capacitor CLC_Cn that is capacitively coupled to the liquid crystal capacitor CLC_Bn of the specific sub-pixel R3 is additionally provided. The configuration of the normal sub-pixel R2 is a configuration in which a potential difference is generated between the normal sub-pixels R1 and R2.

More specifically, a coupling capacitor Cdown_C is formed between a pixel electrode of the normal sub-pixel R2 and a pixel electrode of the specific sub-pixel R3. Like the control capacitor C3 in Embodiment 3, the value of the coupling capacitor Cdown_C may be set large to such an extent that a signal voltage of, for example, 4 V drops by approximately 1 V.

(Layout of Pixel Circuit)

Figure 18:
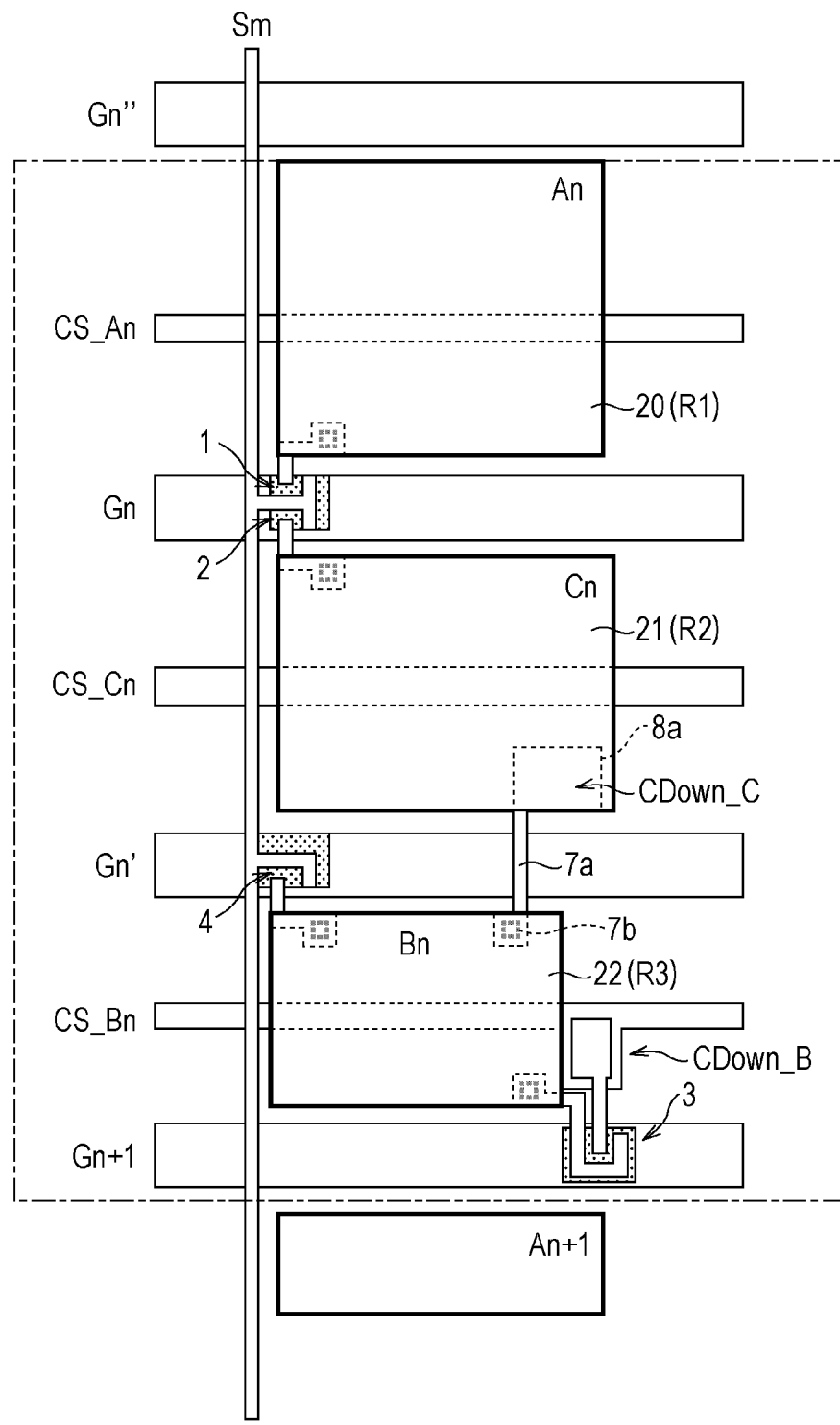
FIG. 18 is a plan view illustrating a schematic layout of the pixel circuit illustrated in FIG. 17 on an active matrix substrate.

FIG. 18 is a plan view illustrating a schematic layout of the pixel circuit illustrated in FIG. 17 on an active matrix substrate.

The difference from the layout illustrated in FIG. 8 will be described. A wiring line 7a extending from below the pixel electrode 22 of the specific sub-pixel R3 extends from below the pixel electrode 21 of the normal sub-pixel R2 over the gate signal line Gn', and forms a capacitor electrode 8a having an extended area. The wiring line 7a is connected to the pixel electrode 22 through a through-hole 7b. The coupling capacitor Cdown_C is formed by the capacitor electrode 8a and the pixel electrode 21, which faces the capacitor electrode 8a with an insulating layer (not illustrated) therebetween. The magnitude of the coupling capacitor Cdown_C can be set appropriately in accordance with the area of the capacitor electrode 8a.

(Driving Example in 2D Display Mode)

Figure 19:
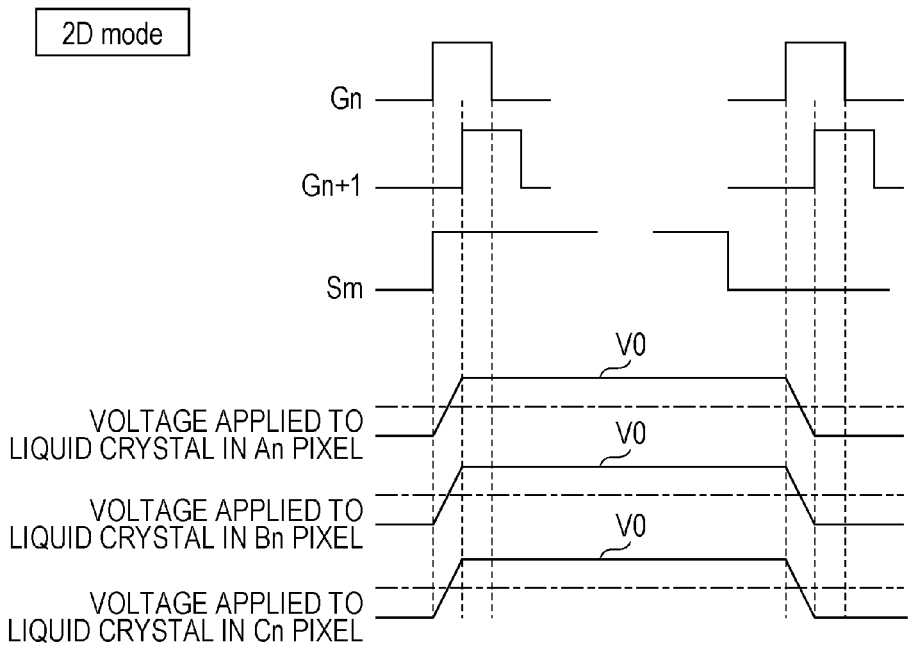
FIG. 19 is a timing chart illustrating the waveforms of gate pulses, signal voltages, and voltages applied to the respective liquid crystal capacitors in the 2D display mode according to Embodiment 4.

FIG. 19 is a timing chart illustrating the waveforms of gate pulses, signal voltages, and voltages applied to the respective liquid crystal capacitors in the 2D display mode.

As illustrated in FIG. 19, in the 2D display mode, since the pulse period of the n-th-stage gate pulse and the pulse period of the (n+1)-th-stage gate pulse overlap, the TFT 3 is turned on by the (n+1)-th-stage gate pulse in a time period during which the sub-pixels R1 to R3 are selected by the n-th-stage gate pulse, and a signal voltage is written to the control capacitor CDown.

Note that no charge is accumulated in the coupling capacitor Cdown_C in response to the writing of a signal voltage. The reason for this is that when the n-th-stage gate pulse is output to the gate signal lines Gn and Gn' and the TFTs 1, 2, and 4 are turned on, the capacitor electrode 8a and the pixel electrode 21, which form the coupling capacitor Cdown_C, have the same potential (V0).

In this way, when the n-th-stage gate pulse is output to the gate signal lines Gn and Gn', the effective voltage V0, which has been reached in response to the writing of a signal voltage to the liquid crystal capacitors CLC_An, CLC_Bn, and CLC_Cn, is still maintained even after the (n+1)-th-stage gate pulse has been output to the gate signal line Gn+1.

As a result, as illustrated in FIG. 16, in the 2D display mode, all the sub-pixels R1 to R3 have the same luminance (for example, high luminance). Hence, the effect of improvements in viewing angle characteristics is not ascertainable.

(Driving Example in 3D Display Mode)

Figure 20:
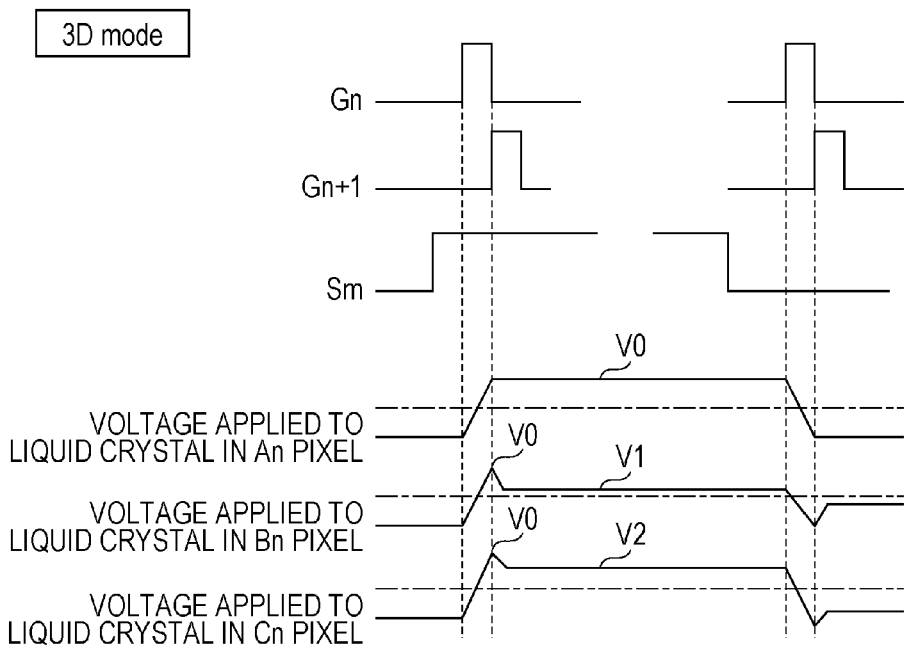
FIG. 20 is a timing chart illustrating the waveforms of gate pulses, signal voltages, and voltages applied to the respective liquid crystal capacitors in the 3D display mode according to Embodiment 4.

FIG. 20 is a timing chart illustrating the waveforms of gate pulses, signal voltages, and voltages applied to the respective liquid crystal capacitors in the 3D display mode.

As illustrated in FIG. 20, in the 3D display mode, since the pulse period of the n-th-stage gate pulse and the pulse period of the (n+1)-th-stage gate pulse do not overlap, the charge accumulated in the liquid crystal capacitor CLC_Cn in a time period during which the sub-pixels R1 to R3 are selected by the n-th-stage gate pulse flows into the coupling capacitor Cdown_C at the time when the (n+1)-th-stage gate pulse is output to the gate signal line Gn+1. Furthermore, the charge accumulated in the liquid crystal capacitor CLC_Bn in a time period during which the sub-pixels R1 to R3 are selected by the n-th-stage gate pulse flows into the control capacitor CDown and the coupling capacitor Cdown_C at the time when the (n+1)-th-stage gate pulse is output to the gate signal line Gn+1.

That is, the charge accumulated in the liquid crystal capacitors CLC_Bn and CLC_Cn is redistributed among four capacitors, namely, the liquid crystal capacitors CLC_Bn and CLC_Cn, the control capacitor CDown, and the coupling capacitor Cdown_C.

As a result, as illustrated in FIG. 20, the effective voltage across the liquid crystal capacitor CLC_Bn drops from the effective voltage V0 to an effective voltage V1 represented by the following formula.

$$V1 = V0 \times (M - CLC\_Cn \times CDown) / (M + Cdown\_C \times CDown) \quad \text{(Formula 1)},$$

where $M = CLC\_Cn \times (CLC\_Bn + Cdown\_C + CDown) + CLC\_Bn \times Cdown\_C$.

Similarly, the effective voltage across the liquid crystal capacitor CLC_Cn drops from the effective voltage V0 to an effective voltage V2 represented by the following formula.

$$V2 = V0 \times M / (M + Cdown\_C \times CDown) \quad \text{(Formula 2)}$$

Comparing the effective voltage V1 in formula 1 given above and the effective voltage V2 in formula 2 given above, it is found that the effective voltage V1 is always smaller than the effective voltage V2, and the relationship V1<V2 is always established regardless the magnitude of the control capacitor CDown, the coupling capacitor Cdown_C, and so forth.

It is also found that as the control capacitor CDown increases, the degree to which the effective voltage V1 drops is larger that the degree to which the effective voltage V2 drops.

In this way, as illustrated in FIG. 16, appropriately setting the values of CDown and Cdown_C allows the normal sub-pixel R1 to exhibit a high luminance and the normal sub-pixel R2 to exhibit a luminance lower than that of the normal sub-pixel R1 in response to the writing of the same signal voltage, whereas, the luminance of the specific sub-pixel R3 can be made dark to such an extent that the specific sub-pixel R3 functions as a black stripe.

Accordingly, it is possible to implement 3D display with suppressed crosstalk while increasing the viewing angle characteristics in accordance with the two levels of luminance of the normal sub-pixels R1 and R2.

Embodiment 5

Still another embodiment of the present invention will be described hereinafter with reference to FIGS. 21 to 25. For convenience of illustration, the same components as those in the foregoing embodiments are assigned the same numerals, and a detailed description thereof is omitted.

(Difference from Embodiment 1)

Figure 25:
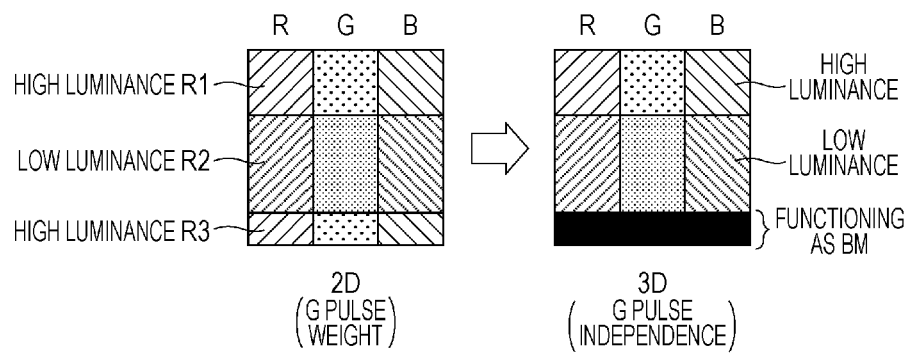
FIG. 25 is an explanatory diagram illustrating an example configuration of pixels in a liquid crystal display device according to Embodiment 5.

FIG. 25 is an explanatory diagram illustrating an example configuration of pixels in a liquid crystal display device according to this embodiment. As illustrated in FIG. 25, similarly to Embodiments 2 to 4, an R pixel includes normal sub-pixels R1 and R2 and a specific sub-pixel R3.

Figure 21:
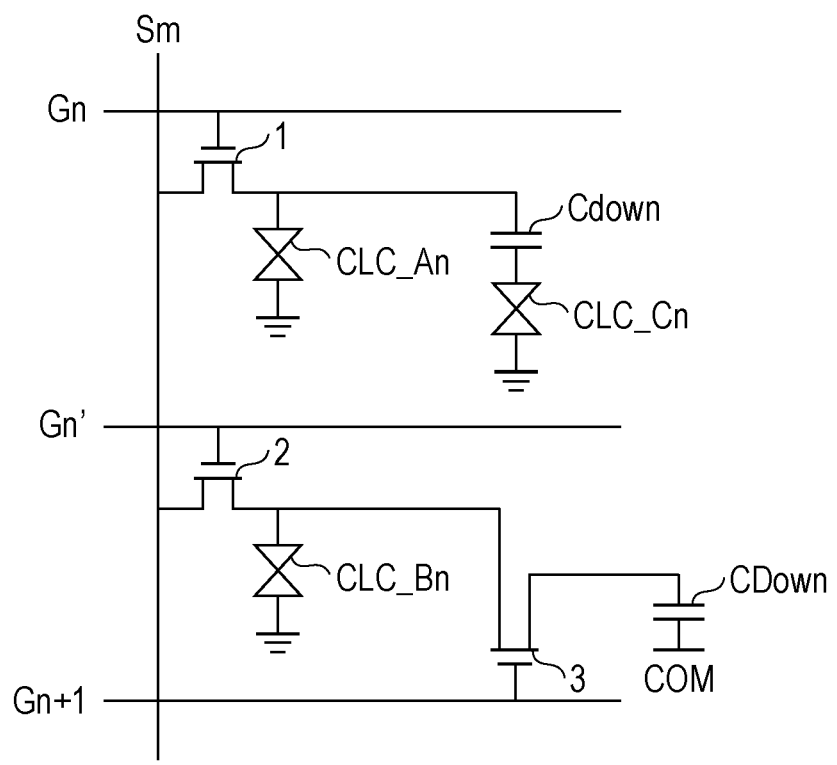
FIG. 21 is a circuit diagram illustrating the equivalent circuit of, for example, an R pixel among pixels illustrated in FIG. 25 according to Embodiment 5.

FIG. 21 is a circuit diagram illustrating the equivalent circuit of, for example, the R pixel among the pixels illustrated in FIG. 25. As is apparent from the circuit diagram in FIG. 21, in this embodiment, the circuit configuration of the specific sub-pixel R3 is the same as the circuit configuration in Embodiment 1, and is different from that in Embodiment 1 in that a normal sub-pixel R2 including a liquid crystal capacitor CLC_Cn that is capacitively coupled to the liquid crystal capacitor CLC_An of the normal sub-pixel R1 is additionally provided. The configuration of the normal sub-pixel R2 is a configuration in which a potential difference is generated between the normal sub-pixels R1 and R2.

More specifically, a coupling capacitor Cdown is formed between a pixel electrode of the normal sub-pixel R1 and a pixel electrode of the normal sub-pixel R2. Appropriately setting the value of the coupling capacitor Cdown allows adjustment of the amount by which the effective voltage across the liquid crystal capacitor CLC_Cn in the normal sub-pixel R2 drops in response to the writing of a signal voltage to the liquid crystal capacitor CLC_An of the normal sub-pixel R1.

More preferably, as described previously, the value of the control capacitor CDown is set large to such an extent that the voltage to be applied to the liquid crystal capacitor CLC_Bn is less than or equal to a threshold value in the 3D display mode, while the value of the coupling capacitor Cdown is set large to such an extent that a signal voltage of, for example, 4 V drops by approximately 1 to 2 V.

(Layout of Pixel Circuit)

Figure 22:
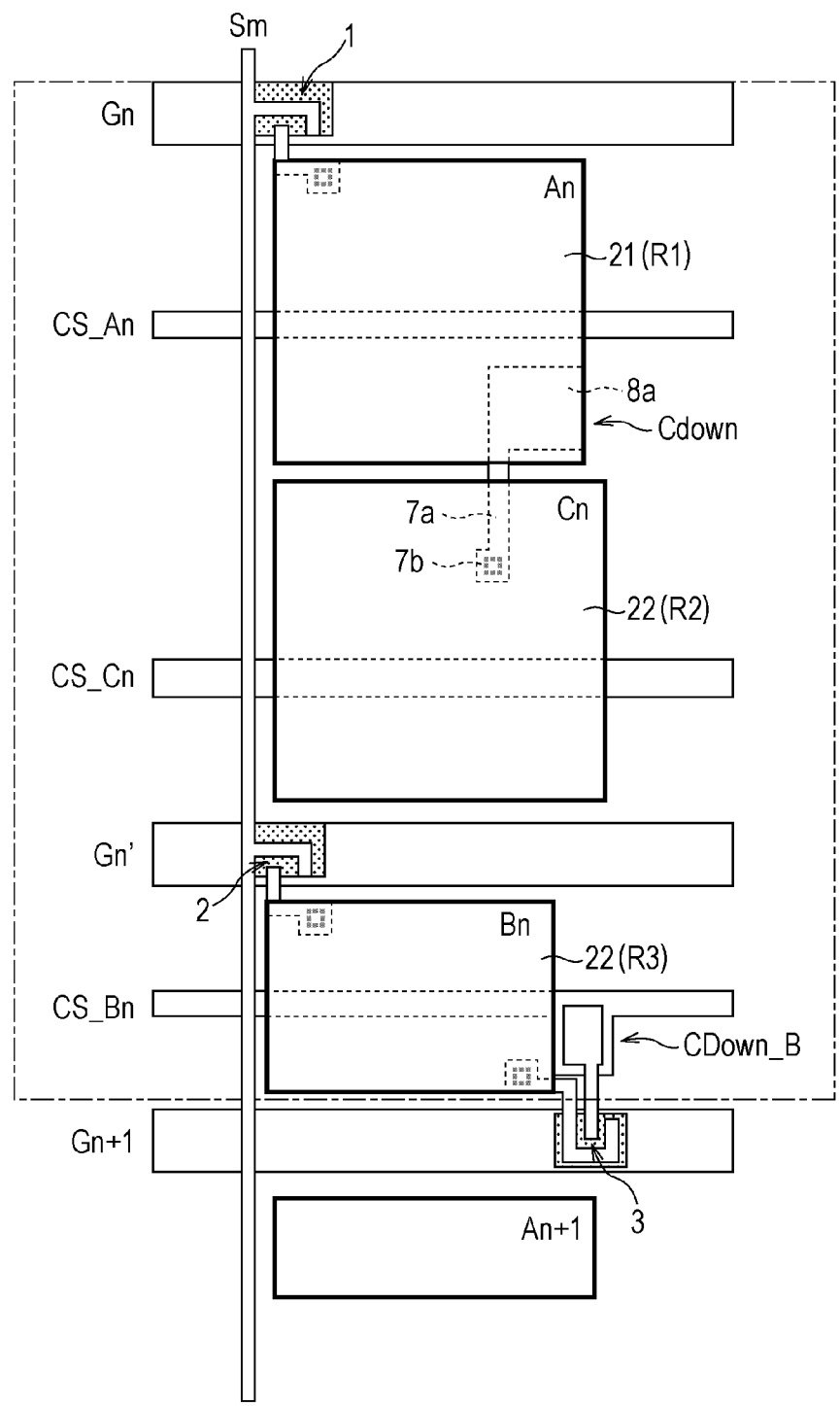
FIG. 22 is a plan view illustrating a schematic layout of the pixel circuit illustrated in FIG. 21 on an active matrix substrate.

FIG. 22 is a plan view illustrating a schematic layout of the pixel circuit illustrated in FIG. 21 on an active matrix substrate.

The difference from the layout illustrated in FIG. 8 will be described. A gate signal line Gn for supplying an n-th-stage gate pulse to a TFT 1 associated with a pixel electrode 21 of the normal sub-pixel R1 is wired adjacent to the (n−1)-th line side with respect to the pixel electrode 21.

In order to capacitively couple the pixel electrode 21 to a pixel electrode 22 of the normal sub-pixel R2, a wiring line 7a extending from below the pixel electrode 22 extends to below the pixel electrode 21 of the normal sub-pixel R1, and forms a capacitor electrode 8a having an extended area. The wiring line 7a is connected to the pixel electrode 22 through a through-hole 7b. The coupling capacitor Cdown is formed by the capacitor electrode 8a and the pixel electrode 21, which faces the capacitor electrode 8a with an insulating layer (not illustrated) therebetween. The magnitude of the coupling capacitor Cdown can be set appropriately in accordance with the area of the capacitor electrode 8a.

(Driving Example in 2D Display Mode)

Figure 23:
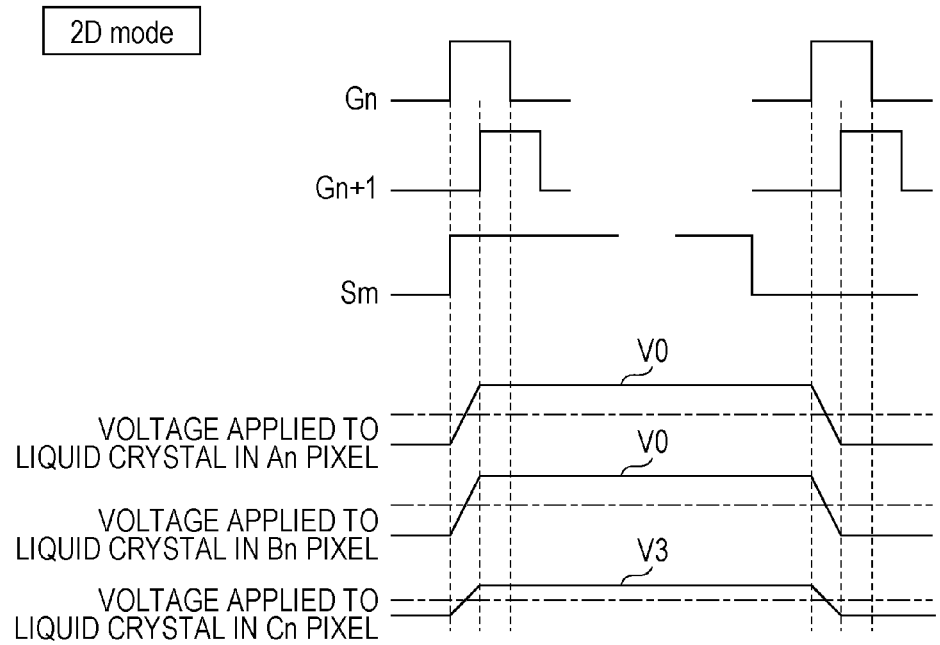
FIG. 23 is a timing chart illustrating the waveforms of gate pulses, signal voltages, and voltages applied to the respective liquid crystal capacitors in the 2D display mode according to Embodiment 5.

FIG. 23 is a timing chart illustrating the waveforms of gate pulses, signal voltages, and voltages applied to the respective liquid crystal capacitors in the 2D display mode.

As illustrated in FIG. 23, in the 2D display mode, since the pulse period of the n-th-stage gate pulse and the pulse period of the (n+1)-th-stage gate pulse overlap, the TFT 3 is turned on by the (n+1)-th-stage gate pulse in a time period during which the normal sub-pixel R1 and the specific sub-pixel R3 are selected by the n-th-stage gate pulse, and a signal voltage is written to the control capacitor CDown.

Note that when the n-th-stage gate pulse is output to the gate signal line Gn and the TFT 1 is turned on, charge is accumulated in the coupling capacitor Cdown and the liquid crystal capacitor CLC_Cn of the normal sub-pixel R2 in accordance with the magnitude of the coupling capacitor Cdown and the liquid crystal capacitor CLC_Cn.

In this way, as illustrated in FIG. 23, when the n-th-stage gate pulse is output to the gate signal lines Gn and Gn', the effective voltage V0, which has been reached in response to the writing of a signal voltage to the liquid crystal capacitors CLC_An and CLC_Bn, is still maintained even after the (n+1)-th-stage gate pulse has been output to the gate signal line Gn+1.

In contrast, the effective voltage across the liquid crystal capacitor CLC_Cn is equal to an effective voltage V3 lower than the effective voltage V0. The effective voltage V3 has a relationship with the effective voltage V0, which is represented by the following formula.

$$V3 = V0 \times Cdown/(Cdown + CLC\_Cn)$$

As a result, as illustrated in FIG. 25, in the 2D display mode, the normal sub-pixel R1 and the specific sub-pixel R3 exhibit a high luminance in response to the writing of the same signal voltage, and the normal sub-pixel R2 exhibits a low luminance. Therefore, it is possible to achieve the effect of improvements in viewing angle characteristics.

(Driving Example in 3D Display Mode)

Figure 24:
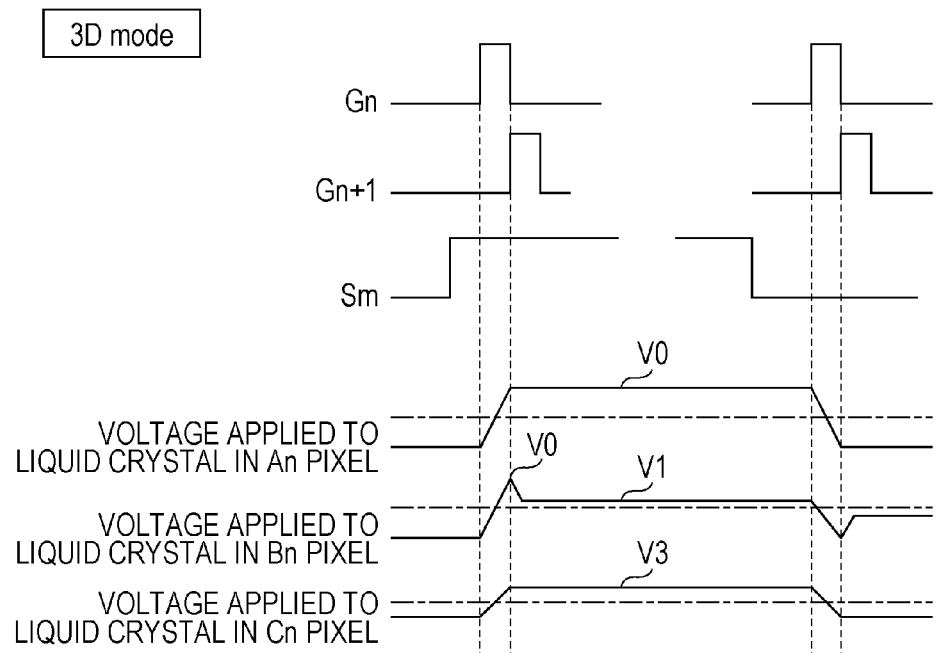
FIG. 24 is a timing chart illustrating the waveforms of gate pulses, signal voltages, and voltages applied to the respective liquid crystal capacitors in the 3D display mode according to Embodiment 5.

FIG. 24 is a timing chart illustrating the waveforms of gate pulses, signal voltages, and voltages applied to the respective liquid crystal capacitors in the 3D display mode.

As illustrated in FIG. 24, in the 3D display mode, since the pulse period of the n-th-stage gate pulse and the pulse period of the (n+1)-th-stage gate pulse do not overlap, the charge accumulated in the liquid crystal capacitor CLC_Bn in a time period during which the sub-pixels R1 and R3 are selected by the n-th-stage gate pulse is redistributed between the liquid crystal capacitor CLC_Bn and the control capacitor CDown at the time when the (n+1)-th-stage gate pulse is output to the gate signal line Gn+1.

As a result, as illustrated in FIG. 24, the effective voltage across the liquid crystal capacitor CLC_Bn drops from the effective voltage V0 to an effective voltage V1 represented by the following formula.

$$V1 = V0 \times CLC\_Bn/(CLC\_Bn + CDown)$$

In contrast, for the liquid crystal capacitors CLC_An and CLC_Cn, the writing of a signal voltage in response to the output of the n-th-stage gate pulse to the gate signal line Gn is not affected by the output of the (n+1)-th-stage gate pulse to the gate signal line Gn+1.

Therefore, similarly to the case of the 2D display mode, the effective voltage across the liquid crystal capacitor CLC_An is kept at the effective voltage V0, and the effective voltage across the liquid crystal capacitor CLC_Cn is equal to the effective voltage V3.

In this way, as illustrated in FIG. 25, appropriately setting the value of CDown allows the normal sub-pixel R1 to exhibit a high luminance and the normal sub-pixel R2 to exhibit a luminance lower than that of the normal sub-pixel R1 in response to the writing of the same signal voltage, whereas, the luminance of the specific sub-pixel R3 can be made dark to such an extent that the specific sub-pixel R3 functions as a black stripe.

Accordingly, it is possible to implement 3D display with suppressed crosstalk while increasing the viewing angle characteristics in accordance with the two levels of luminance of the normal sub-pixels R1 and R2.

[Example Configuration of Display Apparatus Capable of 3D Display]

Figure 26:
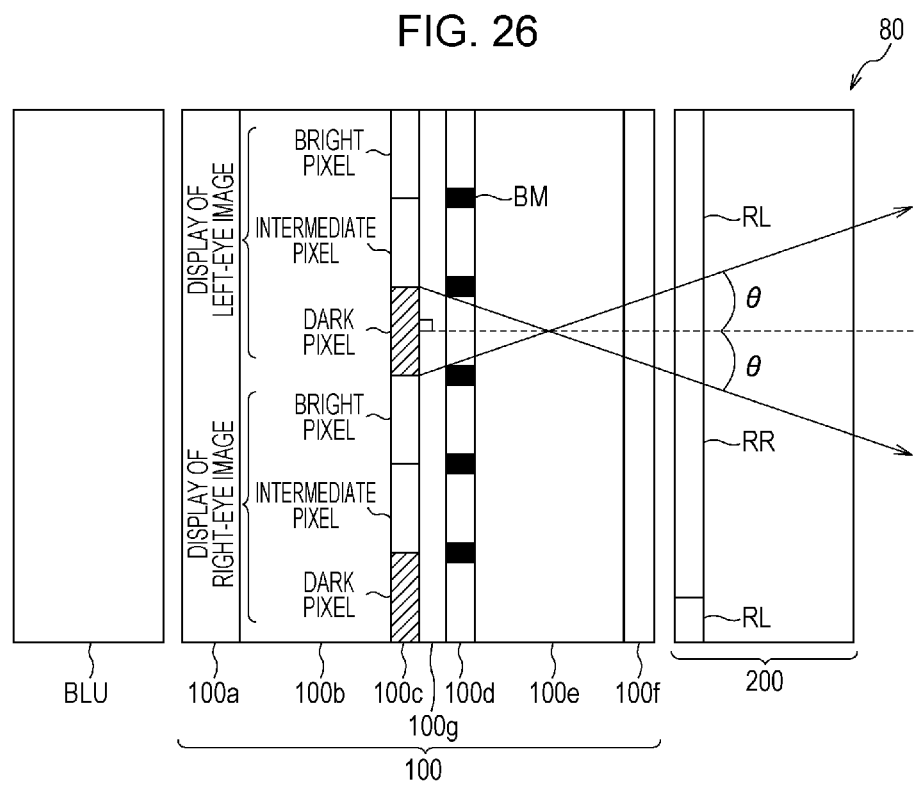
FIG. 26 is a cross-sectional view illustrating an example configuration of a display apparatus including the liquid crystal display device described above and capable of 3D display.

FIG. 26 is a cross-sectional view illustrating an example configuration of a display apparatus 80 including the liquid crystal display device described above and capable of 3D display. The configuration of the display apparatus 80 is similar to the configuration of the related art illustrated in FIGS. 34 and 36. The major difference is that black stripes, which are required in a patterned retarder in the related art, are not provided because one of sub-pixel rows arranged in parallel to gate signal lines for individual pixel rows functions as a black stripe in the 3D display mode.

Note that examples of the display apparatus 80 include general desktop display apparatuses such as displays used for liquid crystal color television receivers or various apparatuses, and general mobile display apparatuses such as those for notebook PCs, mobile phone terminals, and mobile information terminals. The configuration of the display apparatus 80 will be described hereinafter.

The display apparatus 80 includes a liquid crystal panel 100 and a backlight unit BLU disposed on the back side of the liquid crystal panel 100 and serving as a light source of the liquid crystal panel 100. The display apparatus 80 further includes a patterned retarder 200 (optical panel) on the display surface side of the liquid crystal panel 100 (on the side from which light whose light intensity has been modulated by the liquid crystal display device is emitted).

The liquid crystal panel 100 includes a first polarizing plate 100*a*, a glass substrate 100*b*, a TFT array 100*c*, a color filter 100*d*, a glass substrate 100*e*, and a second polarizing plate 100*f*, and a liquid crystal layer 100*g* is held between the TFT array 100*c* and the color filter 100*d*.

The basic configuration of the patterned retarder 200 and its operation in cooperation with 3D glasses are the same as those of the patterned retarder 70 and the 3D glasses 80 already described with reference to FIG. 34, and a detailed description thereof is thus omitted.

Figure 34:
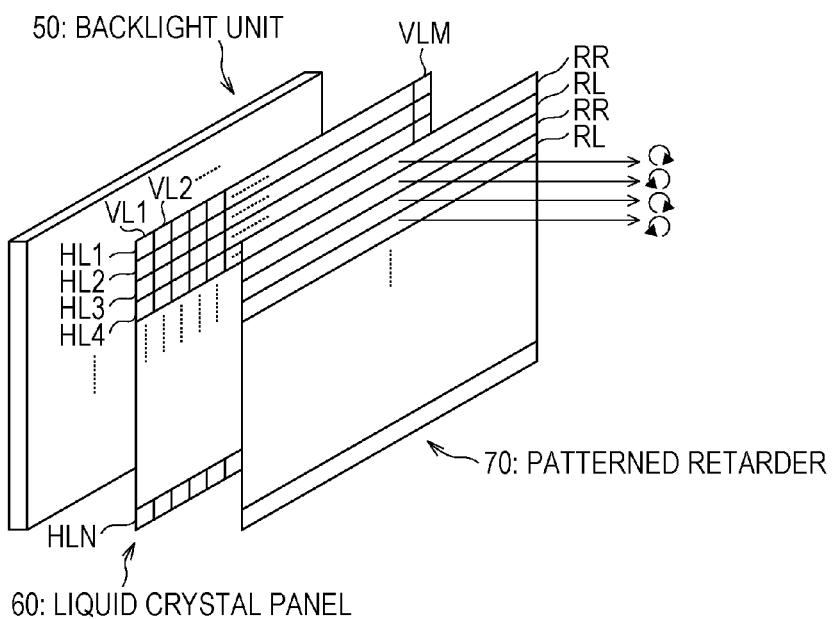
FIG. 34 is an exploded perspective view illustrating the configuration of a liquid crystal display device of the related art which includes a patterned retarder.
Figure 35:
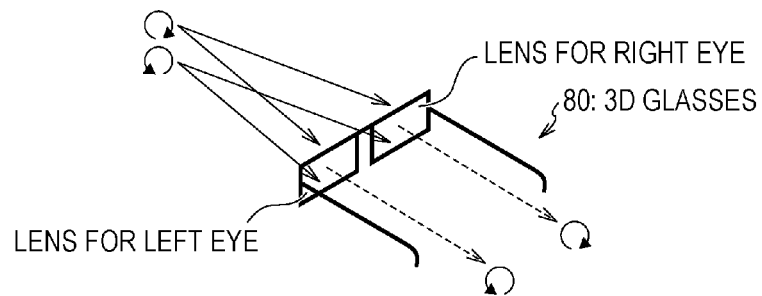
FIG. 35 is an explanatory diagram illustrating 3D glasses used in a patterned retarder system.
Figure 36:
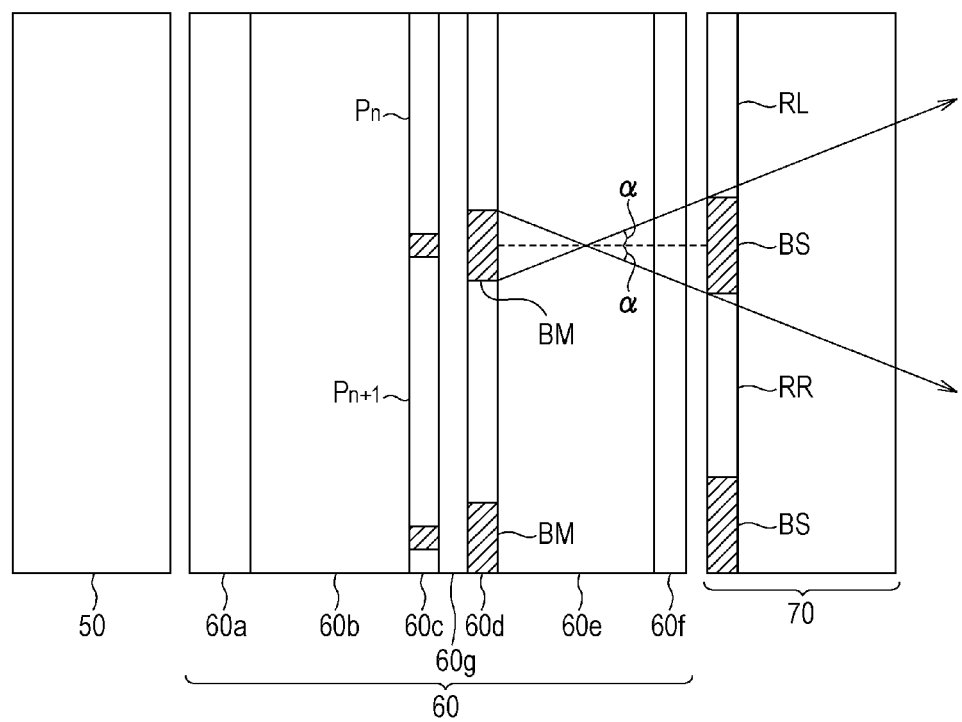
FIG. 36 is a schematic partial cross-sectional view illustrating the configuration of the liquid crystal display device of the related art, taken along the vertical signal line direction.

However, the positional relationships between sub-pixels functioning as black stripes (dark pixels illustrated in FIG. 26) and the boundaries between retarders RR (first optical plates for the right-eye image) and retarders RL (second optical plates for the left-eye image) of the patterned retarder 200 are different from those in the configuration in FIGS. 34 and 36. Specifically, the boundaries between the retarders RR and the retarders RL are arranged so that the perpendiculars dropped from the boundaries to the TFT array 100*c* intersect the dark pixels.

Further, preferably, a line parallel to gate signal lines is arranged to intersect the perpendiculars dropped from the boundaries between the retarders RR and the retarders RL to the TFT array 100*c* so that each of the dark pixels is equally divided into two sections along the corresponding one of the source signal lines. This arrangement can increase the effect of a reduction in crosstalk in the 3D display mode.

The retarders RR and the retarders RL may be formed of, for example, λ/4 wavelength plates having different optical axes. In addition, the retarders RR and the retarders RL may be expressed as, as more generalized terms, optical plates that generate outgoing light beams having different polarization states from incident light.

The TFT array 100*c* in FIG. 26 is configured such that each pixel of R, G, or B includes three sub-pixels, and, as illustrated in FIG. 11, the three sub-pixels are driven as a high-luminance sub-pixel (a bright pixel in FIG. 26), a low-luminance sub-pixel (an intermediate pixel in FIG. 26), and a sub-pixel functioning as a black stripe (a dark pixel in FIG. 26).

The reason that crosstalk is reduced in the 3D display mode is as follows. As illustrated in FIG. 26, within the light emitted from the intermediate pixel among the pixels located right behind the retarder RL for displaying a left-eye image, the light emitted from around the boundary between the intermediate pixel and the adjacent dark pixel is transmitted through the retarder RR when the propagation direction of the light is beyond θ degrees downward with respect to the direction normal to the liquid crystal in the longitudinal direction of the panel liquid crystal panel (the direction in which the three sub-pixels are arranged). That is, the light of the left-eye image is transmitted through the retarder RR for the right-eye image, and crosstalk occurs.

Similarly, within the light emitted from the bright pixel among the pixels located right behind the retarder RR for displaying a right-eye image, the light emitted from around the boundary between the bright pixel and the dark pixel is transmitted through the retarder RL when the propagation direction of the light is beyond θ degrees upward with respect to the direction normal to the liquid crystal panel in the longitudinal direction of the liquid crystal panel. That is, the light of the right-eye image is transmitted through the retarder RL for the left-eye image, and crosstalk occurs.

In the display apparatus 80, therefore, as illustrated in FIG. 26, the angle defined between the direction normal to the liquid crystal panel 100 and the direction of the line of sight is within θ degrees (2θ degrees upward and downward altogether) in the longitudinal direction of the liquid crystal panel, the occurrence of crosstalk can be suppressed.

According to the present invention, therefore, a control capacitor CDown is connected between a pixel electrode of a liquid crystal capacitor CLC_Bn in at least one of a plurality of sub-pixels and a common signal line COM through a TFT 3 whose gate electrode is connected to the gate signal line Gn+1 in the (n+1)-th line. Further, a control circuit is configured to selectively switch between a first output mode in which the pulse periods of a gate pulse output to the gate signal line Gn in the n-th line and a gate pulse output to the gate signal line Gn+1 partially overlap and a second output mode in which these pulse periods do not overlap.

Accordingly, it is possible to provide a liquid crystal display device capable of switching between a 2D display mode and a 3D display mode with suppressed crosstalk without increasing the complexity of wiring such as data bus lines.

A driving method in which the output timings of the n-th-stage gate pulse and the (n+1)-th-stage gate pulse coincide in the first output mode and the second output mode may be used. In this case, it is possible to switch output modes only by changing the pulse width, such as increasing the pulse widths of the n-th-stage gate pulse and the (n+1)-th-stage gate pulse in the first output mode and reducing the pulse widths of the n-th-stage gate pulse and the (n+1)-th-stage gate pulse in the second output mode.

Furthermore, each of a gate pulse in the first output mode and a gate pulse in the second output mode may include a single pulse for one frame period, and the gate pulse in the first output mode may have a longer pulse period than the gate pulse in the second output mode.

Furthermore, a gate pulse in the first output mode may include a plurality of periodic pulses for one frame period, and there may be an overlapping pulse period between a pulse period of any of the second and subsequent pulses in the gate pulse to be output to the gate signal line in the n-th line and a pulse period of any of the first and subsequent pulses in the gate pulse to be output to the gate signal lines in the (n+1)-th and subsequent lines.

In this case, a general-purpose gate driver including normal shift registers can be used. Thus, it is possible to avoid an increase in circuit size and an increase in cost, which may be caused by the modification of the configuration of the gate driver.

In the liquid crystal display device according to the present invention, the control capacitor may be set to a value greater than or equal to that of a liquid crystal capacitor included in the at least one sub-pixel.

As already described, when an (n+i)-th-stage gate pulse is output to the gate signal line in the (n+i)-th line, the first switching element is turned on. Thus, the charge accumulated in the liquid crystal capacitor of the specific sub-pixel is redistributed between the liquid crystal capacitor and the first control capacitor.

In this case, by setting the control capacitor to a value greater than or equal to that of the liquid crystal capacitor of the specific sub-pixel, it is possible to reliably reduce the luminance of the specific sub-pixel. Therefore, when the liquid crystal display device according to the present invention is applied to a stereo display apparatus of the patterned retarder system, the effect of a reduction in crosstalk in 3D display can be achieved. That is, the effect of a reduction in crosstalk in 3D display can be achieved merely by making the luminance of the specific sub-pixel a value of gray without making it solid black.

In the liquid crystal display device according to the present invention, the control capacitor may be set to a value in the second output mode so that an effective voltage across a liquid crystal capacitor included in the at least one sub-pixel is less than or equal to a threshold voltage at which a change in an arrangement of liquid crystal molecules starts.

Thus, as already described, for example, a liquid crystal display device of the normally black mode can allow the specific sub-pixel to perform black display. In the second output mode, therefore, it is possible to create the state that allows a line in which the specific sub-pixel is arranged in the horizontal direction to function as a black stripe.

Accordingly, in a case where a liquid crystal display device according to the present invention is applied to a stereo display apparatus of the patterned retarder system, the effect of a reduction in crosstalk for 3D display can be more reliably achieved.

In the liquid crystal display device according to the present invention, a source signal supplied to each of the source signal lines may be a source signal whose polarity is inverted frame by frame.

In the configuration described above, it is assumed that an (n+i)-th-stage gate pulse is output to the gate signal line in the (n+i)-th line, and the charge accumulated in the liquid crystal capacitor in the specific sub-pixel, for example, plus charge, is redistributed between the liquid crystal capacitor and a first control capacitor.

In this case, in the first control capacitor, minus charge has already been redistributed between the liquid crystal capacitor and the first control capacitor in the frame preceding the current frame. Hence, in the current frame, the plus charge accumulated in the liquid crystal capacitor of the specific sub-pixel cancels the minus charge already accumulated in the first control capacitor, and, in addition, is further redistributed. As a result, the drop of the effective voltage across the liquid crystal capacitor of the specific sub-pixel can be made larger than that in the case where the polarity of the source signal is not inverted frame by frame.

Accordingly, in a case where a liquid crystal display device according to the present invention is applied to a stereo display apparatus of the patterned retarder system, the luminance of the specific sub-pixel can be made darker, and therefore the effect of a reduction in crosstalk for 3D display can be enhanced.

In the liquid crystal display device according to the present invention, the number of sub-pixels per pixel is greater than or equal to three, and assuming that the at least one sub-pixel among the plurality of sub-pixels is called a specific sub-pixel and a sub-pixel other than the specific sub-pixel is called a normal sub-pixel, the number of normal sub-pixels is greater than or equal to two, and a pixel circuit provided for each of the plurality of sub-pixels may have a configuration in which a potential difference is generated between the normal sub-pixels at least in the second output mode so that the normal sub-pixels are divided into a relatively-high-luminance sub-pixel and a low-luminance sub-pixel in response to writing of a source signal through the source signal lines.

In the configuration described above, in a case where the liquid crystal display device performs color display using a combination of primary colors such as red, green, and blue or red, green, blue, and yellow, the pixel described above corresponds to one of the primary colors. For example, each of pixels of primary colors of red, green, blue, and yellow includes at least one specific sub-pixel and two or more normal sub-pixels.

After the plurality of sub-pixels are simultaneously selected through the gate signal line in the n-th line, a potential difference is generated between normal sub-pixels at least in the second output mode. That is, a normal sub-pixel exhibiting a relatively high light transmittance and a normal sub-pixel exhibiting a relatively low light transmittance are generated in response to the writing of the same signal voltage. In other words, the degree of inclination (alignment) of the liquid crystal molecules differs between the normal sub-pixels in response to the writing of the same signal voltage.

As a result, a wide viewing angle can be realized in the second output mode. The reason for this is that the view-angle dependence of the γ characteristics of a liquid crystal display device (the difference between the γ characteristics obtained when observed from front and the γ characteristics obtained when observed obliquely) can be improved by diversifying the degree of inclination of liquid crystal molecules in each pixel.

In the liquid crystal display device according to the present invention,
(1) the normal sub-pixels may include a first normal sub-pixel and a second normal sub-pixel,
(2) the first normal sub-pixel may have a first holding capacitor line that, along with a first pixel electrode, forms a holding capacitor,
(3) the second normal sub-pixel may have a second holding capacitor line that, along with a second pixel electrode, forms a holding capacitor, and
(4) holding capacitor control signals having opposite phases may be applied to the first holding capacitor line and the second holding capacitor line in the first output mode and the second output mode so that a potential difference is generated between the first normal sub-pixel and the second normal sub-pixel.

According to the configuration described above, as described previously, in the first output mode, the signal voltage of a source signal is written to the specific sub-pixel as it is. In contrast, a potential difference is generated between the first normal sub-pixel and the second normal sub-pixel depending on the holding capacitor control signals applied to the respective holding capacitors. More specifically, the voltages written to the first normal sub-pixel and the second normal sub-pixel can be separated into a voltage higher than the signal voltage and a voltage lower than the signal voltage.

Accordingly, in the first output mode, one of the first normal sub-pixel and the second normal sub-pixel exhibits a high luminance and the other exhibits a low luminance with respect to the luminance of the specific sub-pixel. Thus, there are three levels of luminance, namely, high, intermediate, and low. In the first output mode, therefore, the viewing angle characteristics in the case of two levels of luminance can further be increased.

In the second output mode, on the other hand, as described previously, the setting of the value of the control capacitor can make the luminance of the specific sub-pixel dark to such an extent that the specific sub-pixel functions as a black stripe, and one of the first normal sub-pixel and the second normal sub-pixel exhibits a high-luminance while the other exhibits a low luminance. Therefore, it is possible to increase the viewing angle characteristics in accordance with the two levels of luminance.

In the liquid crystal display device according to the present invention, a second control capacitor may be connected between a pixel electrode of at least one normal sub-pixel among the normal sub-pixels and the common signal line through a second switching element whose gate electrode is connected to any of the gate signal lines in the (n+1)-th and subsequent lines, and the value of the second control capacitor may be a value smaller than the first control capacitor.

According to the configuration described above, the normal sub-pixel including the second control capacitor has the same circuit configuration as the specific sub-pixel including the first control capacitor.

In the first output mode, therefore, when an n-th-stage gate pulse is output to the gate signal line in the n-th line, a plurality of sub-pixels constituting a single pixel are simultaneously selected, and the same signal voltage is written individually to the plurality of sub-pixels.

Then, when an (n+i)-th-stage gate pulse having a pulse period which overlaps that of an n-th-stage gate pulse is output to the gate signal line in the (n+i)-th line, a first switching element and a second switching element whose gate electrodes are connected to the gate signal line in the (n+i)-th line are turned on. As a result, the signal voltage described above is written to the first control capacitor included in the specific sub-pixel, and the signal voltage described above is written to the second control capacitor included in the normal sub-pixel. In this condition, the plurality of sub-pixels maintain the same effective voltage. That is, the plurality of sub-pixels have the same luminance.

Meanwhile, in the second output mode, similarly to the first output mode, first, the plurality of sub-pixels are simultaneously selected by the n-th-stage gate pulse. The pulse period of the (n+i)-th-stage gate pulse is set so as not to overlap the pulse period of the n-th-stage gate pulse.

Therefore, the (n+i)-th-stage gate pulse is output to the gate signal line in the (n+i)-th line while the plurality of sub-pixels are in a non-selection state. Accordingly, the first switching element and the second switching element are turned on. Thus, as described previously, charge is redistributed between the liquid crystal capacitor of the specific sub-pixel and the first control capacitor, and charge is redistributed between the liquid crystal capacitor of the at least one normal sub-pixel and the second control capacitor.

As a result, the effective voltage of the specific sub-pixel with respect to the common signal line drops, and the effective voltage of the at least one normal sub-pixel with respect to the common signal line drops. Note that, since the value of the second control capacitor is smaller than the value of the first control capacitor, the degree to which the effective voltage of the at least one normal sub-pixel drops is smaller than the degree to which the effective voltage of the specific sub-pixel drops.

Accordingly, a normal sub-pixel having a relatively high luminance, the at least one normal sub-pixel having a relatively low luminance, and a specific sub-pixel having a relatively lower luminance, to which the signal voltage described above has been written as it is, are generated.

Therefore, in the second output mode, as described previously, the setting of the value of the control capacitor makes the luminance of the specific sub-pixel dark to such an extent that the specific sub-pixel functions as a black stripe while, for the normal sub-pixels, making it possible to increase the viewing angle characteristics in accordance with the two levels of luminance.

In the liquid crystal display device according to the present invention, the specific sub-pixel and the at least one normal sub-pixel among the normal sub-pixels may be connected through a coupling capacitor.

According to the configuration described above, in the first output mode, when an n-th-stage gate pulse is output to the gate signal line in the n-th line, a plurality of sub-pixels constituting a single pixel are simultaneously selected, and the same signal voltage is written individually to the plurality of sub-pixels.

Then, when an (n+i)-th-stage gate pulse having a pulse period which overlaps that of an n-th-stage gate pulse is output to the gate signal line in the (n+i)-th line, a first switching element whose gate electrode is connected to the gate signal line in the (n+i)-th line is turned on. As a result, the signal voltage described above is written to the first control capacitor included in the specific sub-pixel. In this condition, the plurality of sub-pixels maintain the same effective voltage. That is, the plurality of sub-pixels have the same luminance.

Meanwhile, in the second output mode, similarly to the first output mode, first, the plurality of sub-pixels are simultaneously selected by the n-th-stage gate pulse. The pulse period of the (n+i)-th-stage gate pulse is set so as not to overlap the pulse period of the n-th-stage gate pulse.

Therefore, the (n+i)-th-stage gate pulse is output to the gate signal line in the (n+i)-th line while the plurality of sub-pixels are in a non-selection state. Accordingly, the first switching element is turned on. Then, since the specific sub-pixel and the at least one normal sub-pixel are connected through a coupling capacitor, charge accumulated in the specific sub-pixel and the at least one normal sub-pixel is redistributed between the liquid crystal capacitor of the specific sub-pixel, the first control capacitor, the liquid crystal capacitor of the at least one normal sub-pixel, and the coupling capacitor. As a result, the effective voltages of the specific sub-pixel and the at least one normal sub-pixel with respect to the common signal line drop.

Note that the setting of the coupling capacitor and the first control capacitor can make the drop of the effective voltage of the specific sub-pixel larger than the drop of the effective voltage of at least one of the normal sub-pixels.

Accordingly, a normal sub-pixel having a relatively high luminance, the at least one normal sub-pixel having a relatively low luminance, and the specific sub-pixel having a relatively lower luminance, to which the signal voltage described above has been written as it is, can be generated.

Therefore, in the second output mode, as described previously, the setting of the values of the coupling capacitor and the first control capacitor makes the luminance of the specific sub-pixel dark to such an extent that the specific sub-pixel functions as a black stripe while, for the normal sub-pixels, making it possible to increase the viewing angle characteristics in accordance with the two levels of luminance.

In the liquid crystal display device according to the present invention, a liquid crystal capacitor of the first normal sub-pixel among the normal sub-pixels may be connected to the source signal line through selection by the gate pulse, and a liquid crystal capacitor of the second normal sub-pixel among the normal sub-pixel may be connected to the pixel electrode of the first normal sub-pixel through a coupling capacitor.

According to the configuration described above, in the first output mode, when an n-th-stage gate pulse is output to the gate signal line in the n-th line, as a result of selection by the n-th-stage gate pulse, the same signal voltage is written to sub-pixels connected to the source signal line among a plurality of sub-pixels constituting a single pixel. The sub-pixels to which the same signal voltage is written also include the first normal sub-pixel.

Since the liquid crystal capacitor of the second normal sub-pixel is connected to the pixel electrode of the first normal sub-pixel through a coupling capacitor, the effective voltage of the second normal sub-pixel is lower than the effective voltage of the first normal sub-pixel.

Then, when an (n+i)-th-stage gate pulse having a pulse period which overlaps that of an n-th-stage gate pulse is output to the gate signal line in the (n+i)-th line, a first switching element whose gate electrode is connected to the gate signal line in the (n+i)-th line is turned on. As a result, the signal voltage described above is written to the first control capacitor included in the specific sub-pixel. In this condition, the specific sub-pixel and the first normal sub-pixel maintain the same effective voltage. That is, the specific sub-pixel and the first normal sub-pixel have the same luminance.

In the second output mode, on the other hand, when an n-th-stage gate pulse is output to the gate signal line in the preceding stage, the effective voltage of the second normal sub-pixel is lower than the effective voltage of the first normal sub-pixel. This point is the same as that in the first output mode.

Further, when an (n+i)-th-stage gate pulse having a pulse period which does not overlap that of an n-th-stage gate pulse is output to the gate signal line in the (n+i)-th line, the effective voltage of the specific sub-pixel with respect to the common signal line drops. This point has been described previously.

Accordingly, in the first output mode, the specific sub-pixel and the first normal sub-pixel exhibit a high-luminance, and the second normal sub-pixel exhibits a low luminance. Thus, it is possible to increase the viewing angle characteristics in accordance with the two levels of luminance.

In the second output mode, furthermore, as described previously, similarly to the first output mode, the setting of the value of the first control capacitor makes the luminance of the specific sub-pixel dark to such an extent that the specific sub-pixel functions as a black stripe while, for the normal sub-pixels, making it possible to increase the viewing angle characteristics in accordance with the two levels of luminance.

A display apparatus according to the present invention includes (1) any of the liquid crystal display devices described above, and
(2) an optical panel disposed on a side from which light whose light intensity has been modulated by the liquid crystal display device is emitted so as to face the liquid crystal display device, wherein
(3) a display type of the liquid crystal display device is normally black, and
(4) the optical panel has substantially the same length in a row direction as a length of one row of the pixels arranged in the row direction, the optical panel has substantially the same length in a column direction as a length of one column of the pixels arranged in the column direction, and first optical plates that generate outgoing light having a first polarization state from incident light and second optical plates that have substantially the same shape as the first optical plates and that generate outgoing light having a second polarization state different from the first polarization state from incident light are formed at positions corresponding to odd-numbered rows and even-numbered rows, respectively, of the pixels arranged in the row direction.

According to the configuration described above, the first optical plates of the optical panel generate outgoing light having a first polarization state when transmitting outgoing light of the pixels in the odd-numbered rows among the pixels two-dimensionally arranged on the liquid crystal display device. Further, the second optical plates of the optical panel generate outgoing light having a second polarization state when transmitting outgoing light of the pixels arranged in the even-numbered rows.

Accordingly, in the second output mode, for example, a right-eye image is displayed using the pixels arranged in the odd-numbered rows, and a left-eye image is displayed using the pixels arranged in the even-numbered rows, thus allowing the optical panel to emit a right-eye image and a left-eye image with parallax at different polarization states.

Therefore, a user is able to view a 3D image by using 3D glasses which support the different polarization states. In the first output mode, furthermore, a normal image without parallax is displayed using the respective pixels, thus allowing the user to view a 2D image as usual with the naked eye.

Since the display type of the liquid crystal display device is normally black, in the second output mode, as described previously, the luminance of the specific sub-pixel is reduced, and the specific sub-pixel functions as a black stripe. This can suppress crosstalk for 3D image display without increasing the complexity of wiring to allow the specific sub-pixel to function as a black stripe.

In addition, since no need exists to provide the optical panel with a black stripe, brighter 2D display and 3D display than that in the related art can be achieved.

Additionally, a liquid crystal display device having a configuration in which a single pixel is provided with a plurality of normal sub-pixels and a luminance difference is generated between the normal sub-pixels in response to the writing of a signal voltage in the first output mode or the second output mode can achieve 2D display or 3D display with a wide viewing angle.

The present invention is not limited to the foregoing embodiments, and a variety of modifications can be made without departing from the scope defined by the claims. Embodiments obtained by appropriately combining technical means disclosed in different embodiments are also included in the technical range of the present invention.

INDUSTRIAL APPLICABILITY

The present invention is suitably applicable to general mobile and desktop liquid crystal display devices configured to stereoscopically display images using the patterned retarder system.

REFERENCE SIGNS LIST

3 TFT (first switching element)
5 TFT (second switching element)
10, 11, 13 pixel electrode
22, 23 pixel electrode
20 pixel electrode (first pixel electrode)
21 pixel electrode (second pixel electrode)

30 liquid crystal display device
32 gate driver
34 external driving circuit (control circuit)
80 display apparatus
100 liquid crystal panel
200 patterned retarder (optical panel)
CDown control capacitor (first control capacitor)
C3 control capacitor (second control capacitor)
Cdown_C coupling capacitor
CLC_An liquid crystal capacitor
CLC_Bn liquid crystal capacitor
COM common signal line
CS_An holding capacitor line (first holding capacitor line)
CS_Cn holding capacitor line (second holding capacitor line)
Gn, Gn', Gn" gate signal line (gate signal line in the n-th line)
Gn+1 gate signal line (gate signal line in the (n+1)-th line)
R1 sub-pixel (normal sub-pixel)
R2 sub-pixel (normal sub-pixel)
R3 sub-pixel (specific sub-pixel)
Sm source signal line
RR retarder (first optical plate for a right-eye image)
RL retarder (second optical plate for a left-eye image)

The invention claimed is:

1. A liquid crystal display device at least comprising:
a plurality of gate signal lines;
a plurality of source signal lines;
pixels disposed so as to correspond to intersections between the gate signal lines and the source signal lines;
a gate driver that selectively outputs a gate pulse to the plurality of gate signal lines; and
a control circuit that controls a pulse period of the gate pulse, wherein
each of the pixels includes a plurality of sub-pixels selected through a gate signal line in an n-th line,
a first control capacitor is connected between a pixel electrode of at least one sub-pixel among the plurality of sub-pixels and a common signal line through a first switching element whose gate electrode is connected to one of gate signal lines in (n+1)-th and subsequent lines,
the control circuit selectively switches between a first output mode in which a pulse period of a gate pulse to be output to the gate signal line in the n-th line and a pulse period of a gate pulse to be output to the one of the gate signal lines in the (n+1)-th and subsequent lines partially overlap and a second output mode in which the pulse periods do not overlap,
the number of sub-pixels per pixel is greater than or equal to three,
assuming that the at least one sub-pixel among the plurality of sub-pixels is called a specific sub-pixel and a sub-pixel other than the specific sub-pixel is called a normal sub-pixel, the number of normal sub-pixels is greater than or equal to two, and a pixel circuit included in each of the plurality of sub-pixels has a configuration in which a potential difference is generated between the normal sub-pixels at least in the second output mode so that the normal sub-pixels are divided into a relatively-high-luminance sub-pixel and a low-luminance sub-pixel in response to writing of a source signal through the source signal line,
the normal sub-pixels include a first normal sub-pixel and a second normal sub-pixel,
the first normal sub-pixel has a first holding capacitor line that, along with a first pixel electrode, forms a holding capacitor,
the second normal sub-pixel has a second holding capacitor line that, along with a second pixel electrode, forms a holding capacitor, and
holding capacitor control signals having opposite phases are applied to the first holding capacitor line and the second holding capacitor line in the first output mode and the second output mode so that a potential difference is generated between the first normal sub-pixel and the second normal sub-pixel.

2. The liquid crystal display device according to claim 1, wherein
a gate pulse in the first output mode and a gate pulse in the second output mode each include a single pulse for one frame period, and the gate pulse in the first output mode has a longer pulse period than the gate pulse in the second output mode.

3. The liquid crystal display device according to claim 1, wherein
a gate pulse in the first output mode includes a plurality of periodic pulses for one frame period, and there is an overlapping pulse period between a pulse period of any of the second and subsequent pulses in the gate pulse to be output to the gate signal line in the n-th line and a pulse period of any of the first and subsequent pulses of the gate pulse to be output to the gate signal lines in the (n+1)-th and subsequent lines.

4. The liquid crystal display device according to claim 1, wherein
the control capacitor is set to a value greater than or equal to that of a liquid crystal capacitor included in the at least one sub-pixel.

5. A liquid crystal display device at least comprising:
a plurality of gate signal lines;
a plurality of source signal lines;
pixels disposed so as to correspond to intersections between the gate signal lines and the source signal lines;
a gate driver that selectively outputs a gate pulse to the plurality of gate signal lines; and
a control circuit that controls a pulse period of the gate pulse, wherein
each of the pixels includes a plurality of sub-pixels selected through a gate signal line in an n-th line,
a first control capacitor is connected between a pixel electrode of at least one sub-pixel among the plurality of sub-pixels and a common signal line through a first switching element whose gate electrode is connected to one of gate signal lines in (n+1)-th and subsequent lines,
the control circuit selectively switches between a first output mode in which a pulse period of a gate pulse to be output to the gate signal line in the n-th line and a pulse period of a gate pulse to be output to the one of the gate signal lines in the (n+1)-th and subsequent lines partially overlap and a second output mode in which the pulse periods do not overlap,
the number of sub-pixels per pixel is greater than or equal to three,
assuming that the at least one sub-pixel among the plurality of sub-pixels is called a specific sub-pixel and a sub-pixel other than the specific sub-pixel is called a normal sub-pixel, the number of normal sub-pixels is greater than or equal to two, and a pixel circuit included in each of the plurality of sub-pixels has a configuration in which a potential difference is generated between the normal sub-pixels at least in the second output mode so that the normal sub-pixels are divided into a relatively-high luminance sub-pixel and a low-luminance sub-pixel in response to writing of a source signal through the source signal line, the normal sub-pixels include a first normal sub-pixel and a second normal sub-pixel, a second control capacitor is connected between the pixel electrode of the at least one normal sub-pixel among the normal sub-pixels and the common signal line through a second switching element whose gate electrode is connected to the one of the gate signal lines in the (n+1)-th and subsequent lines, and the second control capacitor has a value smaller than the first control capacitor.

6. The liquid crystal display device according to claim 5, wherein a gate pulse in the first output mode and a gate pulse in the second output mode each include a single pulse for one frame period, and the gate pulse in the first output mode has a longer pulse period than the gate pulse in the second output mode.

7. The liquid crystal display device according to claim 5, wherein a gate pulse in the first output mode includes a plurality of periodic pulses for one frame period, and there is an overlapping pulse period between a pulse period of any of the second and subsequent pulses in the gate pulse to be output to the gate signal line in the n-th line and a pulse period of any of the first and subsequent pulses of the gate pulse to be output to the gate signal lines in the (n+1)-th and subsequent lines.

8. The liquid crystal display device according to claim 5, wherein the control capacitor is set to a value greater than or equal to that of a liquid crystal capacitor included in the at least one sub-pixel.

9. A liquid crystal display device at least comprising:

a plurality of gate signal lines;

a plurality of source signal lines;

pixels disposed so as to correspond to intersections between the gate signal lines and the source signal lines;

a gate driver that selectively outputs a gate pulse to the plurality of gate signal lines; and a control circuit that controls a pulse period of the gate pulse, wherein each of the pixels includes a plurality of sub-pixels selected through a gate signal line in an n-th line, a first control capacitor is connected between a pixel electrode of at least one sub-pixel among the plurality of sub-pixels and a common signal line through a first switching element whose gate electrode is connected to one of gate signal lines in (n+1)-th and subsequent lines, the control circuit selectively switches between a first output mode in which a pulse period of a gate pulse to be output to the gate signal line in the n-th line and a pulse period of a gate pulse to be output to the one of the gate signal lines in the (n+1)-th and subsequent lines partially overlap and a second output mode in which the pulse periods do not overlap, the number of sub-pixels per pixel is greater than or equal to three, assuming that the at least one sub-pixel among the plurality of sub-pixels is called a specific sub-pixel and a sub-pixel other than the specific sub-pixel is called a normal sub-pixel, the number of normal sub-pixels is greater than or equal to two, and a pixel circuit included in each of the plurality of sub-pixel has a configuration in which a potential difference is generated between the normal sub-pixels at least in the second output mode so that the normal sub-pixels are divided into a relatively-high-luminance sub-pixel and a low-luminance sub-pixel in response to writing of a source signal through the source signal line, the normal sub-pixels include a first normal sub-pixel and a second normal sub-pixel, and the specific sub-pixel and the at least one normal sub-pixel among the normal sub-pixels are connected through a coupling capacitor.

10. The liquid crystal display device according to claim 9, wherein a gate pulse in the first output mode and a gate pulse in the second output mode each include a single pulse for one frame period, and the gate pulse in the first output mode has a longer pulse period than the gate pulse in the second output mode.

11. The liquid crystal display device according to claim 6, wherein a gate pulse in the first output mode includes a plurality of periodic pulses for one frame period, and there is an overlapping pulse period between a pulse period of any of the second and subsequent pulses in the gate pulse to be output to the gate signal line in the n-th line and a pulse period of any of the first and subsequent pulses of the gate pulse to be output to the gate signal lines in the (n+1)-th and subsequent lines.

12. The liquid crystal display device according to claim 9, wherein the control capacitor is set to a value greater than or equal to that of a liquid crystal capacitor included in the at least one sub-pixel.

\* \* \* \* \*